United States Patent
Miyake et al.

(10) Patent No.: US 8,831,405 B2
(45) Date of Patent: Sep. 9, 2014

(54) TRANSMISSION CONTROLLER, RECEPTION CONTROLLER, TRANSMISSION CONTROL METHOD, RECEPTION CONTROL METHOD AND TRANSMISSION CONTROL PROGRAM

(75) Inventors: Yasushi Miyake, Osaka (JP); Keiichi Takagaki, Osaka (JP); Naoya Takao, Hyogo (JP)

(73) Assignee: Panasonic Corporation, Osaka (JP)

( * ) Notice: Subject to any disclaimer, the term of this patent is extended or adjusted under 35 U.S.C. 154(b) by 48 days.

(21) Appl. No.: 13/388,539

(22) PCT Filed: Aug. 5, 2010

(86) PCT No.: PCT/JP2010/004935
§ 371 (c)(1),
(2), (4) Date: Feb. 2, 2012

(87) PCT Pub. No.: WO2011/016241
PCT Pub. Date: Feb. 10, 2011

(65) Prior Publication Data
US 2012/0128333 A1    May 24, 2012

(30) Foreign Application Priority Data
Aug. 5, 2009   (JP) ................ 2009-182389

(51) Int. Cl.
H04N 5/92 (2006.01)
H04N 21/434 (2011.01)
H04N 21/435 (2011.01)
H04N 5/913 (2006.01)
H04N 21/8355 (2011.01)
H04N 21/235 (2011.01)
H04N 21/4627 (2011.01)

(52) U.S. Cl.
CPC ........... *H04N 5/913* (2013.01); *H04N 21/4348* (2013.01); *H04N 21/435* (2013.01); *H04N 21/4345* (2013.01); *H04N 21/4344* (2013.01); *H04N 2005/91328* (2013.01); *H04N 21/8355* (2013.01); *H04N 2005/91364* (2013.01); *H04N 21/235* (2013.01); *H04N 21/4627* (2013.01)
USPC .......................................... 386/248; 386/252

(58) Field of Classification Search
None
See application file for complete search history.

(56) References Cited

U.S. PATENT DOCUMENTS

2002/0044657 A1   4/2002  Asano et al.
2003/0233665 A1   12/2003  Tsujino et al.
(Continued)

FOREIGN PATENT DOCUMENTS

JP     2002-83465     3/2002
JP     2004-104752    4/2004
(Continued)

OTHER PUBLICATIONS

International Search Report issued Nov. 16, 2010 in International (PCT) Application No. PCT/JP2010/004935.

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

A transmission control device generates, based on a content stream acquired from an external source, auxiliary information necessary for at least one of recording and playback of a content in the content stream and transmits a transmission target stream to an external device. The transmission target stream includes a first stream portion based on the content stream and a second stream portion based on the generated auxiliary information.

13 Claims, 14 Drawing Sheets

(56) References Cited

U.S. PATENT DOCUMENTS

| | | |
|---|---|---|
| 2005/0155076 A1* | 7/2005 | Utsumi et al. ............... 725/105 |
| 2005/0226237 A1* | 10/2005 | Chapel et al. ............... 370/389 |
| 2006/0034584 A1 | 2/2006 | Kim et al. |
| 2007/0009232 A1 | 1/2007 | Muraki et al. |
| 2007/0162981 A1 | 7/2007 | Morioka et al. |
| 2007/0192625 A1* | 8/2007 | Carr ............................ 713/189 |
| 2007/0286577 A1* | 12/2007 | Kato et al. .................... 386/95 |
| 2009/0193101 A1* | 7/2009 | Munetsugu et al. ........ 709/219 |

FOREIGN PATENT DOCUMENTS

| | | |
|---|---|---|
| JP | 2006-54896 | 2/2006 |
| JP | 2006-217434 | 8/2006 |
| JP | 2007-34903 | 2/2007 |
| WO | 2005/020234 | 3/2005 |
| WO | 2005/057865 | 6/2005 |

\* cited by examiner

FIG. 4

| CCI (Copy Control Information) | Description |
|---|---|
| CF (Copy Free) | Copyable without restriction |
| EPN (Encryption Plus Non – Assertion) | Copyable freely; encryption required upon transmission |
| COG (Copy One Generation) | One generation of copies may be made |
| NMC (No More Copy) | Cannot be copied further |
| CN (Copy Never) | Copying prohibited |

US 8,831,405 B2

TRANSMISSION CONTROLLER, RECEPTION CONTROLLER, TRANSMISSION CONTROL METHOD, RECEPTION CONTROL METHOD AND TRANSMISSION CONTROL PROGRAM

TECHNICAL FIELD

The present invention relates to a content recording device, such as a television with a content recording function or a BD (Blu-ray Disc)/DVD (Digital Versatile Disc) recorder. The present invention particularly relates to transmission control technology when transmitting a recorded content to an external device.

BACKGROUND ART

Conventional technology allows for transmission of a content recorded on a content recording device to a content playback device via an interface conforming to standards such as IEEE (Institute of Electrical and Electronic Engineers) 1394 or Ethernet (registered trademark). The content playback device then plays back the received content.

Possible scenarios in which such content transmission might occur include recording a digital broadcast program on a content recording device located in the living room, transmitting the recorded program to a content playback device located in the bedroom, and then playing the program back in the bedroom.

If the content is, for example, in MPEG (Moving Picture Experts Group) 2-TS (Transport Stream) format, the content playback device needs to analyze the entire received content stream and generate information (hereinafter, "auxiliary information") necessary for playback or recording of content.

This auxiliary information includes, for example, information on the coding method of video and audio composing the content; a time map that lists a Presentation Time Stamp (PTS) and a Source Packet Number (SPN) for playback times of a predetermined length (such as 0.5 seconds) to allow for playback from any position within the content, fast-forward, and the like; digital copy control information for controlling the level of restriction on recording of the content; and the like.

In order to generate the auxiliary information, it is necessary to analyze each TS packet composing the content stream. The processing load for this analysis grows relatively large. This leads to the problem, for example, that it takes a relatively large amount of time from when the content recording device starts transmitting the content stream upon user request until the content is recorded on the content playback device and is ready for playback.

One known method of resolving this problem is for the content recording device to analyze the content stream, acquire Copy Control Information (CCI), and attach the CCI to the header of any packet in the content stream upon transmission (see, for example, Patent Literature 1).

CITATION LIST

Patent Literature

Patent Literature 1: Japanese Patent Application No. 2002-83465

SUMMARY OF INVENTION

Technical Problem

Some contents, however, may have different CCI levels set for a plurality of segments within the content. For example, segment A of the content may be set to "No More Copy" (NMC), whereas segment B may be set to "Copy Free" (CF).

To address such a case with the method in Patent Literature 1, the content playback device has to continually monitor the header of every packet received. This is because the CCI may be attached to the header of any packet, and the content playback device does not know which packet headers include the CCI.

As a result, even though the processing load for the content playback device to analyze the received content stream and acquire the CCI is reduced to some degree with the method in Patent Literature 1, the processing load is still relatively large. Accordingly, the same problem exists in that it takes a relatively long time for the content playback device to be able to play back a content.

The present invention has been conceived in light of the above problem, and it is an object thereof to provide a transmission control device that uses a different method than conventional methods to shorten the time from when a content recording device starts transmitting a content stream until the content is recorded on an external device, such as a content playback device, and is ready for playback.

Solution to Problem

In order to solve the above problem, a transmission control device according to the present invention comprises a generation unit operable to generate, based on a content stream acquired from an external source, auxiliary information necessary for at least one of recording and playback of a content in the content stream; and a transmission unit operable to transmit a transmission target stream to an external device, the transmission target stream composed of a first stream portion based on the content stream and a second stream portion based on the auxiliary information generated by the generation unit.

Advantageous Effects of Invention

With the above structure, the transmission control device according to the present invention shortens the time from the start of transmission of a content stream until the content is recorded on an external device, such as a content playback device, and is ready for playback.

BRIEF DESCRIPTION OF DRAWINGS

FIG. 4 illustrates CCI.

DESCRIPTION OF EMBODIMENT

With reference to the drawings, the following describes an embodiment of a transmission control device and a reception control device according to the present invention.
Embodiment
<Structure>
<Content Transmission/Reception System>

Figure 1:
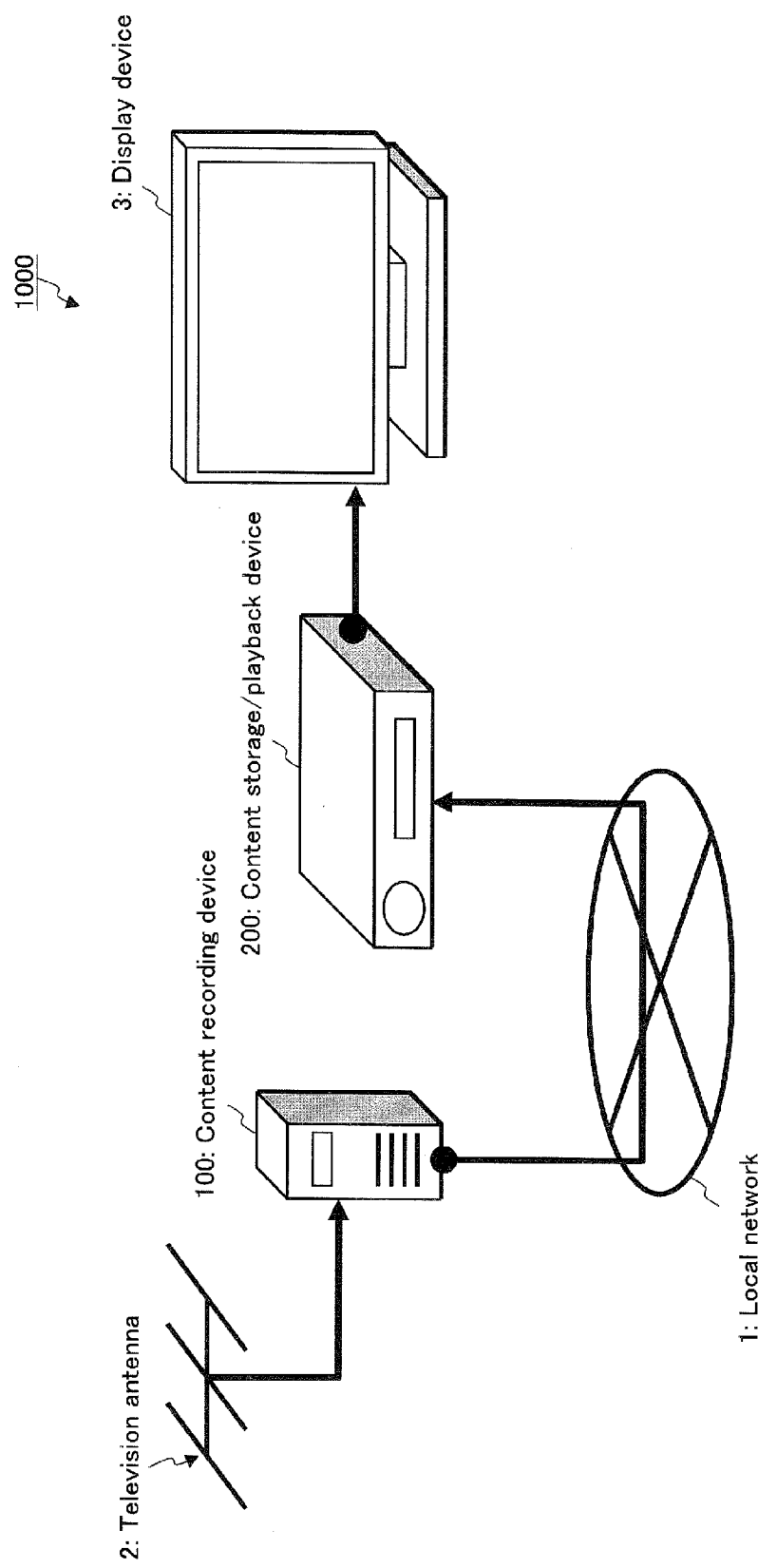
FIG. 1 is a system configuration diagram of a content transmission/reception system 1000 according to the embodiment.

FIG. 1 is a system configuration diagram of a content transmission/reception system 1000 according to the embodiment.

The content transmission/reception system 1000 includes a content recording device 100 and a content storage/playback device 200. The content recording device 100 is provided with the transmission control device according to the embodiment, whereas the content storage/playback device 200 is provided with the reception control device according to the embodiment.

The content recording device 100 is, for example, a Personal Computer (PC) or Hard Disk Driver (HDD) recorder. The content storage/playback device 200 is, for example, a PC, an HDD recorder, a mobile terminal, or the like. The two devices are placed in different rooms of a user's home and are connected by a local network 1 that complies with the Ethernet (registered trademark).

The content storage/playback device 200 is connected to a display device 3 (a television or the like) via a High-Definition Multimedia Interface (HDMI) cable.

The content recording device 100 has the functions of receiving a program record request from a user for recording of a designated digital broadcast program, receiving a content stream (a stream in MPEG2-TS format) for the designated program via a television antenna 2, and recording the content stream as well as auxiliary information, generated based on the content stream, that is necessary for recording and playing back the content.

Note that an Arrival Time Stamp (ATS) is attached to the top of each TS packet in the recorded content stream indicating the arrival time of the TS packet. A content stream composed of TS packets each having an ATS attached thereto is hereinafter referred to as a "partial stream".

The content recording device 100 also has the function of receiving from the user a transfer or copy start request for a designated digital broadcast program that has been recorded, as well as the function of transmitting, to the content storage/playback device 200, a transmission target stream generated based on the partial stream for the designated program and the corresponding auxiliary information.

The content storage/playback device 200 has the functions of receiving the transmission target stream transmitted by the content recording device 100, acquiring the partial stream and the auxiliary information from the received transmission target stream, and recording the partial stream and the auxiliary information.

The content storage/playback device 200 also has the functions of receiving a request from the user for playback of a designated digital broadcast program that has been recorded, playing back the content of the program based on the partial stream and the auxiliary information for the designated program, and outputting video and audio to the display device 3.

The content storage/playback device 200 thus plays back content using the auxiliary information included in the transmission target stream received from the content recording device 100, without generating any new auxiliary information. Accordingly, playback of content is possible immediately after reception of the transmission target stream.

Note while the content transmission/reception system 1000 is described in the embodiment as including one content recording device and one content storage/playback device, a plurality of each device may be included. Furthermore, the number of content recording devices and the number of content storage/playback devices may be different.

Figure 2:
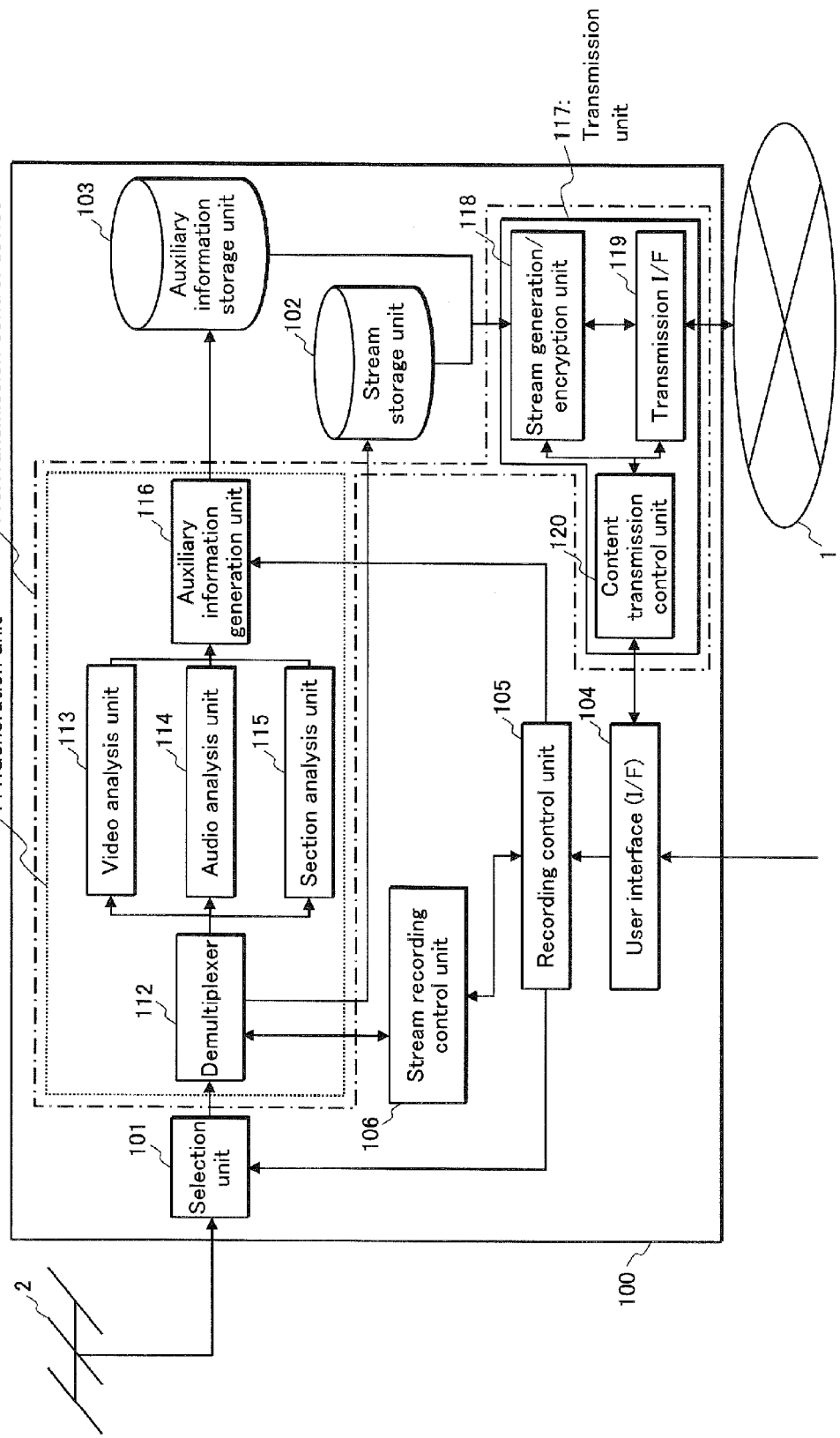
FIG. 2 is a block diagram showing the functional structure of the main portion of a content recording device 100 provided with a transmission control device 110 according to the embodiment.
Figure 3:
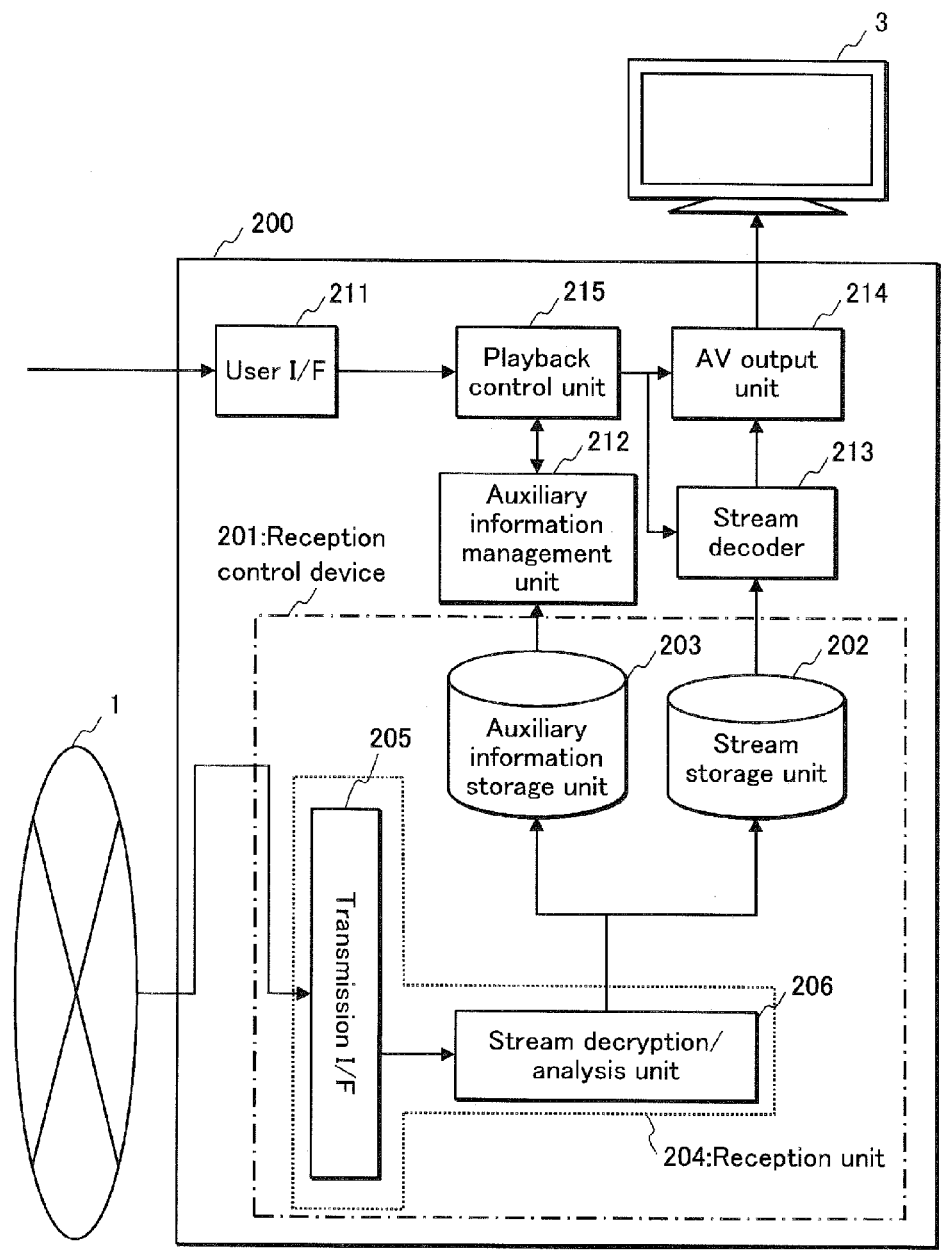
FIG. 3 is a block diagram showing the functional structure of the main portion of a content storage/playback device 200 provided with a reception control device 201 according to the embodiment.

The following describes the content recording device 100 and the content storage/playback device 200 in detail with reference to FIGS. 2 and 3.
<Content Recording Device>

First, the structure of the content recording device 100 is described.

FIG. 2 is a block diagram showing the functional structure of the main portion of the content recording device 100, which is provided with a transmission control device 110 according to the embodiment.

As shown in FIG. 2, in addition to the transmission control device 110, the content recording device 100 includes a selection unit 101, a stream storage unit 102, an auxiliary information storage unit 103, a user interface (I/F) 104, a recording control unit 105, and a stream recording control unit 106.

The content recording device 100 is composed of a processor and a memory. The functions of the selection unit 101, the recording control unit 105, the stream recording control unit 106, and the transmission control device 110 are achieved by the processor executing programs stored in the memory.

The selection unit 101 includes a digital broadcast tuner. The selection unit 101 has the function of controlling the digital broadcast tuner to receive, via the television antenna 2, a signal at a frequency that includes a channel designated by the recording control unit 105. The selection unit 101 also has the functions of demodulating and unscrambling the received signal and of outputting a resulting MPEG2-TS stream to a demultiplexer 112, described below, in the transmission control device 110.

The stream storage unit 102 is implemented by a storage medium, such as a hard disk. The stream storage unit 102 has the function of recording a partial stream for a program designated by a program record request received from a user.

The partial stream is stream data in MPEG2-TS format that conforms to Association of Radio Industries and Broadcast (ARIB) standards. The data structure and the like of the partial stream are described below (see FIG. 5).

The auxiliary information storage unit 103 is implemented by a storage medium, such as a hard disk. The auxiliary information storage unit 103 has the function of storing auxiliary information generated based on a received content stream.

This auxiliary information is necessary for playback and recording of the content. The auxiliary information includes coding information necessary for decoding video and audio, time map information necessary for various methods of playing back the content, digital copy control information indicating the level of restriction on recording of the content when copying or transferring the content, and the like.

Methods of playing back a content include not only regular playback, in which a content is played back from the start at regular speed along the playback time axis, but also the following forms of playback: resume playback to continue playback from the position at which previous playback was interrupted, jump and fast forward to advance the playback position a desired length of time, trickplay to change the playback speed to a desired multiple, and the like.

Note that details on the data structure and the like of the auxiliary information are provided below (see FIG. 7).

The user I/F 104 has the functions of receiving a request from a user via a regular input device, such as a remote control (a program record request, a transfer or copy start request, and the like) and of transmitting a signal corresponding to the received request to the recording control unit 105 or to a content transmission control unit 120, described below, in the transmission control device 110, in accordance with the received request.

The recording control unit 105 has the function of indicating, to the selection unit 101, the channel of the digital broadcast program designated by the program record request received from the user via the user I/F 104. After indicating the channel to the selection unit 101, the recording control unit 105 also has the function of instructing the stream recording control unit 106 and an auxiliary information generation unit 116, described below, in the transmission control device 110 to start recording the program on the channel (service) of the digital broadcast program designated by the program record request.

The stream recording control unit 106 has the functions of confirming that a service ID is included in a Program Association Table (PAT) of the MPEG2-TS stream output by the selection unit 101 to the demultiplexer 112. The service ID identifies the service designated by the instruction from the recording control unit 105 to start recording a program. Upon confirming that the service ID is included, the stream recording control unit 106 has the function of indicating the service ID to the demultiplexer 112.

The transmission control device 110 is provided with a generation unit 111 and a transmission unit 117.

The generation unit 111 has, in particular, the function of generating auxiliary information for the program designated by the program record request received from the user. The generation unit 111 includes the demultiplexer 112, a video analysis unit 113, an audio analysis unit 114, a section analysis unit 115, and the auxiliary information generation unit 116.

The demultiplexer 112 has the functions of extracting, from the MPEG2-TS stream output by the selection unit 101, TS packets corresponding to the service ID designated by the stream recording control unit 106, converting the extracted TS packets into a partial stream by attaching an ATS to the top of each TS packet, and storing the partial stream in the stream storage unit 102.

Note that the ATS expresses the arrival time of the corresponding TS packet as a 27 MHz 32-bit counter.

The demultiplexer 112 also has the function of sequentially detecting video Packetized Elementary Stream packets (PES), audio PES packets, and sections that correspond to the service ID indicated by the stream recording control unit 106. The demultiplexer 112 has the function of transmitting the video PES to the video analysis unit 113, the audio PES to the audio analysis unit 114, and the section to the section analysis unit 115.

The video analysis unit 113 has the functions of analyzing the video PES transmitted by the demultiplexer 112 and of transmitting a picture type, PTS, PES size, and the like included in the video PES to the auxiliary information generation unit 116.

The picture type indicates one of an I picture, a B picture, and a P picture.

When the video PES transmitted by the demultiplexer 112 includes a sequence header or a GOP header, the video analysis unit 113 also transmits the headers to the auxiliary information generation unit 116.

The audio analysis unit 114 has the functions of analyzing the audio PES transmitted by the demultiplexer 112 and of transmitting a PTS, PES size, and the like included in the audio PES to the auxiliary information generation unit 116.

The section analysis unit 115 has the functions of analyzing the sections transmitted by the demultiplexer 112 by type, such as PAT, Program Map Table (PMT), and Selection Information Table (SIT), and of transmitting the title or the like of the program, a video PID, an audio PID, CCI, and the like to the auxiliary information generation unit 116.

The auxiliary information generation unit 116 has the functions of generating auxiliary information based on the information transmitted by the video analysis unit 113, the audio analysis unit 114, and the section analysis unit 115, and storing the generated auxiliary information in the auxiliary information storage unit 103.

The transmission unit 117 has the function of generating a transmission target stream for a program upon receiving a program transfer or copy start request from the user via the user I/F 104. The transmission unit 117 also has the function of transmitting the transmission target stream to the content storage/playback device 200. The transmission unit 117 includes a stream generation/encryption unit 118, a transmission I/F 119, and the content transmission control unit 120.

The stream generation/encryption unit 118 has the function of generating, in accordance with the instruction from the content transmission control unit 120, a transmission target stream based on the partial stream and corresponding auxiliary information for the program selected by the user. The stream generation/encryption unit 118 also has the function of transmitting the transmission target stream to the transmission I/F 119.

Note that, while details are described below, the stream generation/encryption unit 118 generates the transmission target stream by encrypting the partial stream and the corresponding auxiliary information in accordance with the CCI of the partial stream.

The data structure and the like of the transmission target stream are described below (see FIGS. 8 and 10).

The transmission I/F 119 includes a Network Interface Card (NIC) and has the function of transmitting data to, and receiving data from, another device (in this example, the content storage/playback device 200) via the local network 1.

In particular, in accordance with an instruction from the content transmission control unit 120, the transmission I/F 119 searches for other devices that are candidate destination devices for the transmission target stream. The transmission I/F 119 then transmits the transmission target stream received from the stream generation/encryption unit 118 to the device selected by the user from among the candidates.

Note that in the embodiment, searching for candidate destination devices is preformed using the Universal Plug and Play protocol (UPnP). The transmission target stream is transmitted using Hyper Text Transfer Protocol (HTTP).

The content transmission control unit 120 has the functions of receiving, via the user I/F 104, a user instruction to transfer or copy a program and of then instructing the transmission I/F 119 to search for candidate destination devices for the transmission target stream.

The content transmission control unit 120 also has the function, upon receiving a program transfer or copy start request from the user via the user I/F 104, of instructing the stream generation/encryption unit 118 to generate a transmission target stream for the program designated by the request.

Note that the program transfer or copy start request is assumed to include information (such as an IP address or host name) that indicates the destination device selected by the user from among the candidate destination devices for the transmission target stream yielded by the search performed by the transmission I/F 119.

<Content Storage/Playback Device>

Next, the structure of the content storage/playback device 200 is described.

FIG. 3 is a block diagram showing the functional structure of the main portion of the content storage/playback device 200, which is provided with a reception control device 201 according to the embodiment.

In addition to the reception control device 201, the content storage/playback device 200 includes a user I/F 211, an auxiliary information management unit 212, a stream decoder 213, an Audio Visual (AV) output unit 214, and a playback control unit 215, as shown in FIG. 3.

The content storage/playback device 200 includes a processor and a memory. The functions of the auxiliary information management unit 212, the stream decoder 213, the AV output unit 214, the playback control unit 215, and the reception control device 201 are achieved by the processor executing programs stored in the memory.

The reception control device 201 has the functions of receiving a transmission target stream transmitted by the content recording device 100 over the local network 1, acquiring a partial stream and auxiliary information from the received transmission target stream, and storing the partial stream and the auxiliary information.

The reception control device 201 includes a stream storage unit 202, an auxiliary information storage unit 203, and a reception unit 204.

The stream storage unit 202 is implemented by a storage medium, such as a hard disk. The stream storage unit 202 has the function of recording the partial stream acquired from the transmission target stream received from the content recording device 100 over the local network 1.

The auxiliary information storage unit 203 is implemented by a storage medium, such as a hard disk. The auxiliary information storage unit 203 has the function of storing the auxiliary information acquired from the transmission target stream received from the content recording device over the local network 1.

The reception unit 204 includes a transmission I/F 205 and a stream decryption/analysis unit 206.

The transmission I/F 205 includes an NIC and has the function of transmitting data to, and receiving data from, another device (in this example, the content recording device 100) via the local network 1.

In particular, in accordance with UPnP protocol, the transmission I/F 205 responds to an inquiry from the content recording device 100 to search for candidate destination devices for the transmission target stream, receives the transmission target stream from the content recording device 100 using HTTP, and transmits the transmission target stream to the stream decryption/analysis unit 206.

The stream decryption/analysis unit 206 has the function of decrypting, as necessary, the transmission target stream received from the content recording device 100 via the transmission I/F 205 and of acquiring the partial stream and the auxiliary information. The stream decryption/analysis unit 206 also has the functions of storing the acquired partial stream in the stream storage unit 202 and of storing the acquired auxiliary information in the auxiliary information storage unit 203.

The I/F 211 has the functions of receiving a request from the user (such as for playback, fast forward, trickplay, or the like of a program) via an ordinary input device, such as a remote control, and of transmitting a signal corresponding to the received request to the playback control unit 215.

The requests from the user include information designating a requested program.

In response to an instruction from the playback control unit 215, the auxiliary information management unit 212 has the function of reading auxiliary information stored in the auxiliary information storage unit 203.

In response to an instruction from the playback control unit 215, the stream decoder 213 has the functions of reading the partial stream from the stream storage unit 202 and decoding video and audio. The stream decoder 213 also has the function of transmitting, to the AV output unit 214, the resulting uncompressed digital data such as Red, Green, Blue (RGB) data and Pulse Code Modulation (PCM) data.

In response to an instruction from the playback control unit 215, the AV output unit 214 has the function of outputting, to the display device 3, the uncompressed digital data transmitted by the stream decoder 213. The AV output unit 214 outputs the data over the HDMI cable in compliance with HDMI standards.

Upon receiving a playback request or other request from the user via the I/F 211, the playback control unit 215 has the function of performing playback control of a program content designated by the playback request or other request.

In particular, the playback control unit 215 instructs the auxiliary information management unit 212 to read the auxiliary information of the program designated by the received playback request or other request. Based on the read auxiliary information, the playback control unit 215 instructs the stream decoder 213 to decode the partial stream of the program designated by the received playback request or other request and instructs the AV output unit 214 to output the decoded data.

<Data>

The following describes the data used in the content transmission/reception system 1000.

<CCI>

FIG. 4 illustrates the CCI.

The CCI indicates a copy restriction level for the content of a digital broadcast program. As shown in FIG. 4, the CCI has five restriction levels. From less to more restricted, the levels are CF, Encryption Plus Non-Assertion (EPN), Copy One Generation (COG), NMC, and Copy Never (CN).

CF indicates that the content can be copied without restriction. EPN indicates that the content may be copied as long as the content is encrypted when transmitted.

COG indicates that one generation of copies may be made (i.e. copying one time). NMC indicates that after making one copy, copying is prohibited. If the content of a program set to COG is copied once, the CCI of the content is updated from COG to NMC.

CN indicates that copying of the content is prohibited. Even if a content is set to CN, the content is of course still viewable.

If during the same playback time slot, one content has different CCI levels set for the video ES and the audio ES, copy control conforms to the CCI indicating the strictest level.

<Partial Stream>

Figure 5:
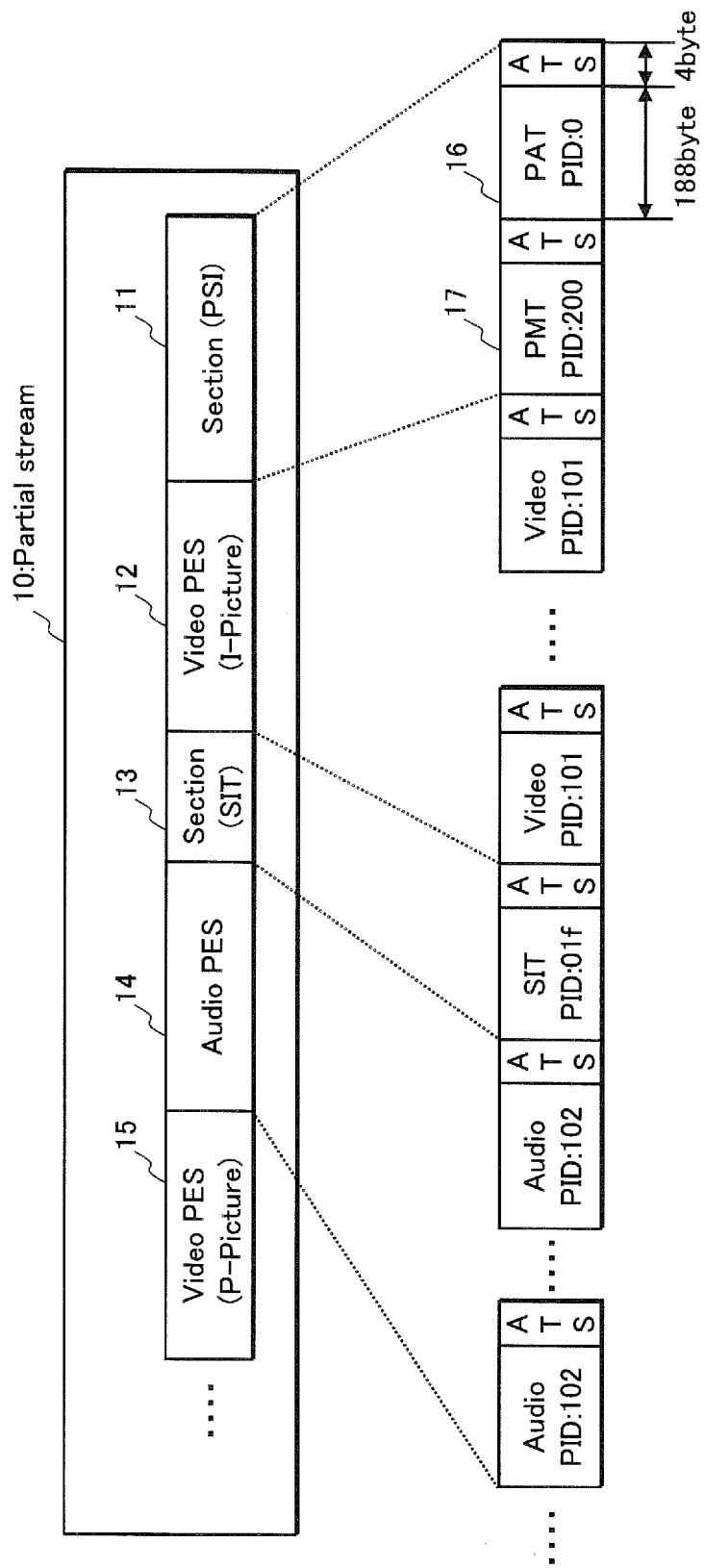
FIG. 5 shows an example of the data structure and content of a partial stream 10.

FIG. 5 shows an example of the data structure and content of a partial stream 10.

As shown in FIG. 5, the partial stream 10 is composed of TS packets (188 bytes in size) that form the MPEG2-TS format content stream, which conforms to ARIB standards, received by the content recording device 100 based on a recording request from the user. The TS packets each have a four-byte ATS attached to the top thereof (hereinafter referred to as Time stamped TS (TTS) packets).

The partial stream 10 is stored in the stream storage unit 102 by the demultiplexer 112 of the content recording device 100. The partial stream 10 is read when the stream generation/encryption unit 118 generates a transmission target stream.

While not shown in FIG. 5, the partial stream 10 can be randomly accessed at predetermined intervals (for example, every 0.5 seconds). In other words, as described above, the partial stream 10 supports not only regular playback, but also other forms of playback such as resume, jump, fast-forward, and trickplay.

Furthermore, as shown in FIG. 5, the partial stream 10 includes a section (PSI) 11 composed of a PAT 16 and a PMT 17, a video PES (I-Picture) 12, a section (SIT) 13, an audio PES 14, and a video PES (P-Picture) 15.

Note that in FIG. 5, only the top portion of the partial stream 10 is shown. The remaining portion of the partial stream 10 has a similar structure.

The PID shown in FIG. 5 is indicated as a hexadecimal.

The section (PSI) 11 is information necessary for selection. Therefore, the section (PSI) 11 is repeatedly transmitted, by the broadcast station broadcasting the program, at a predetermined interval of 0.1 seconds or less. Furthermore, while FIG. 5 shows the PMT 17 as being stored in only one TS packet, depending on the size of the PMT, the PMT may be stored in a plurality of TS packets. In other words, the section (PSI) 11 may be composed of three or more TTS packets.

<Specific Example of Partial Stream>

The following describes a specific example of the partial stream 10. In this example, the user requests recording of a program consisting of program A and program B, which are broadcast at consecutive time slots, and a partial stream 20 is recorded by the content recording device 100.

Figure 6:
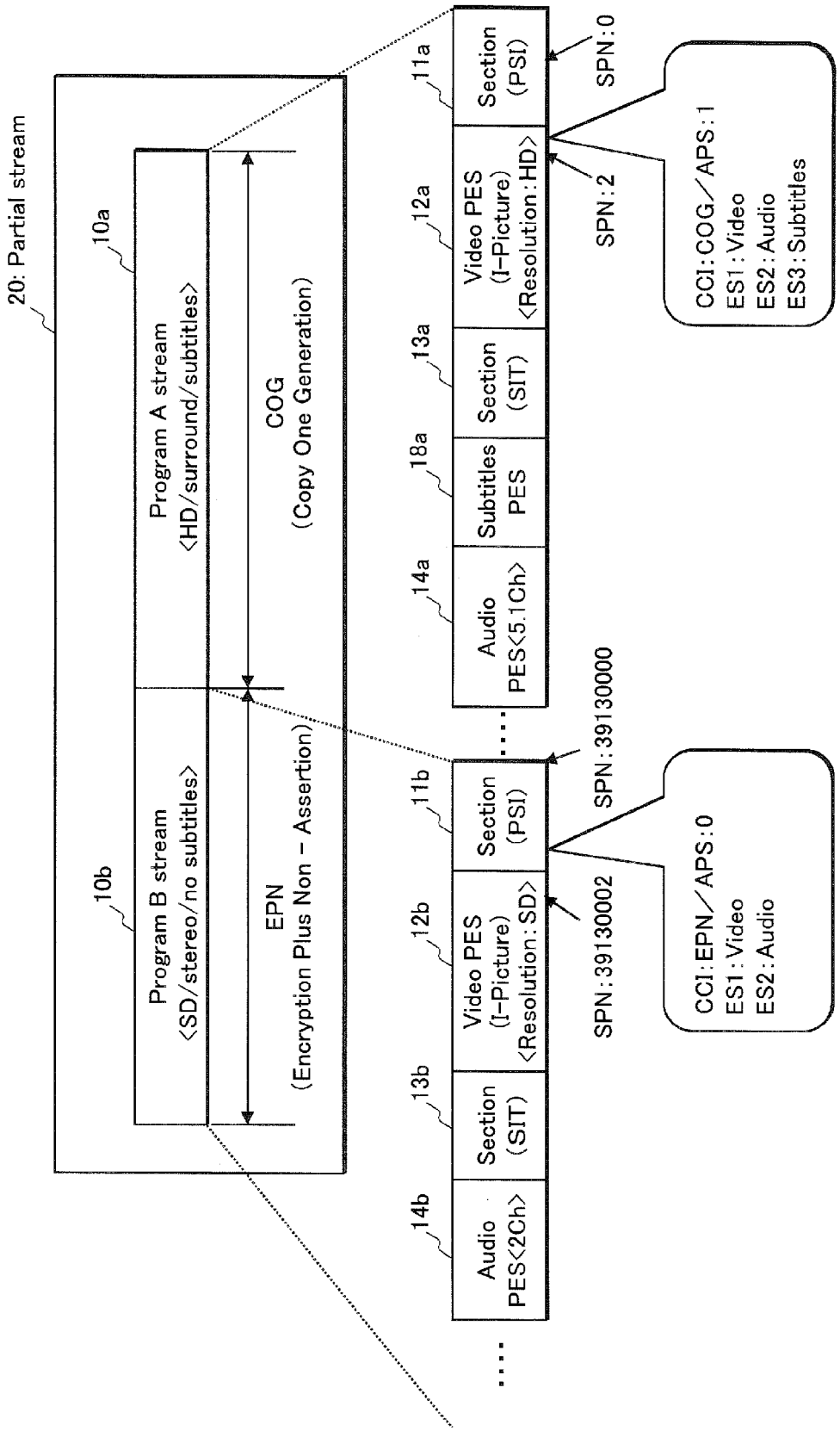
FIG. 6 shows an example of the data structure and content of a partial stream 20.

FIG. 6 shows an example of the data structure and content of the partial stream 20.

As shown in FIG. 6, the partial stream 20 is composed of a program A stream 10a and a program B stream 10b.

The program A stream 10a is stream data in MPEG2-TS format for a program A (such as a movie) with High-Definition (HD) video resolution, surround 5.1 channel audio, and subtitles.

The program A stream 10a includes a section (PSI) 11a, a video PES (I-Picture) 12a, a section (SIT) 13a, a subtitle PES 18a, and an audio PES 14a.

COG is set as the CCI in the section (PSI) 11a. As described in FIG. 4, one generation of copies (i.e. copying one time) of program A is thus indicated as being permitted.

The program B stream 10b is stream data in MPEG2-TS format for a program B (such as a news program) with Standard-Definition (SD) video resolution, stereo two channel audio, and no subtitles.

The program B stream 10b includes a section (PSI) 11b, a video PES (I-Picture) 12b, a section (SIT) 13b, and an audio PES 14b.

EPN is set as the CCI in the section (PSI) 11b. As described in FIG. 4, the content of program B is thus indicated as being copyable as long as the content is encrypted when transmitted.

In FIG. 6, as in FIG. 5, the section (PSI) 11a and the section (PSI) 11b are both shown as being composed of two TTS packets. In this example, the SPN at the head of the section (PSI) 11a is "0". The SPN at the head of the video PES (I-Picture) 12a is "2". The SPN at the head of the section (PSI) 11b is "39130000". The SPN at the head of the PES (I-Picture) 12b is "39130002".

The SPN is information indicating the position of the TTS packet within a partial stream file.

<Auxiliary Information>

Figure 7:
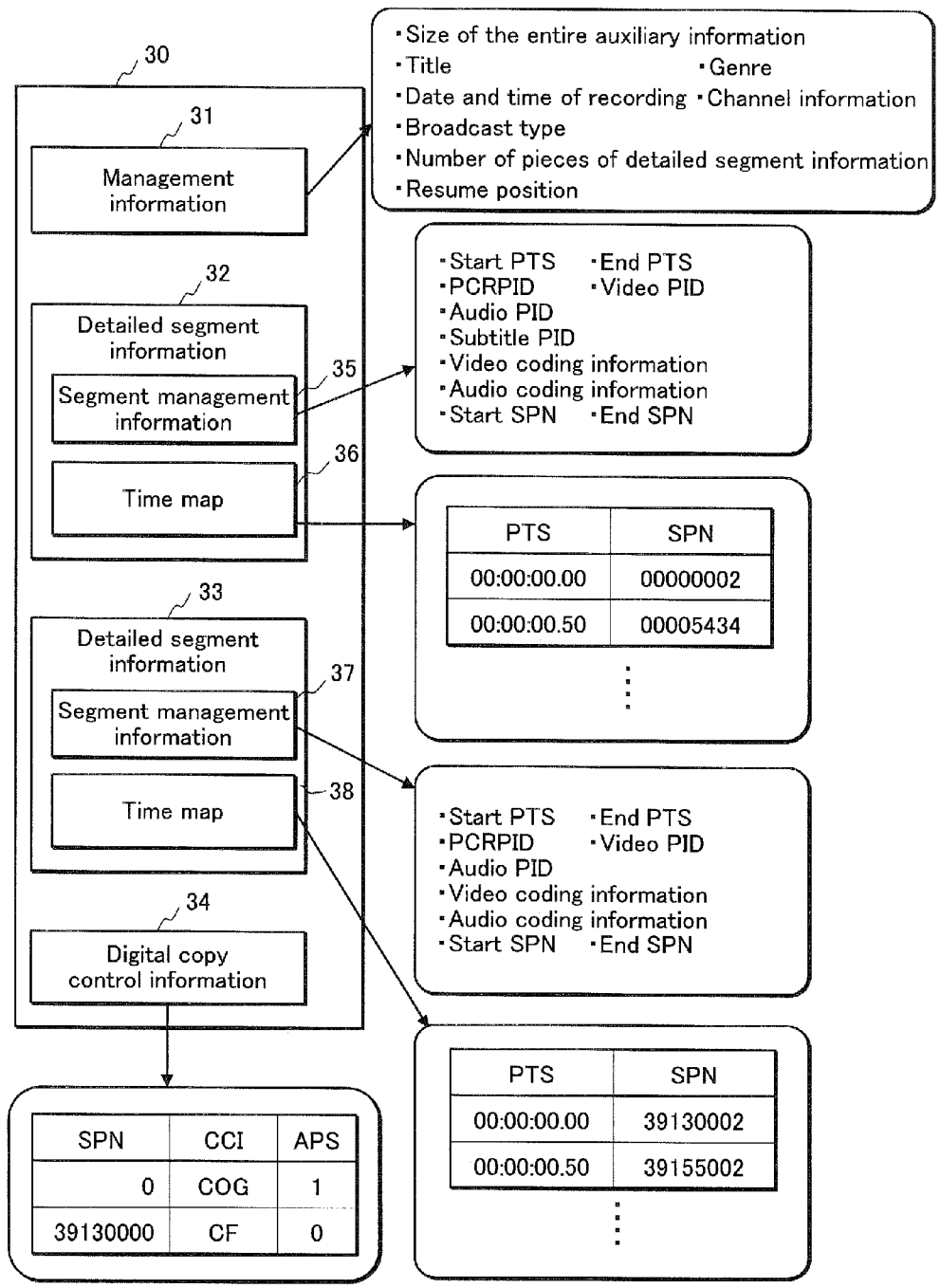
FIG. 7 shows an example of the data structure and content of auxiliary information 30 for the partial stream 20.

FIG. 7 shows an example of the data structure and content of auxiliary information 30 for the partial stream 20.

The auxiliary information 30 is read when the stream generation/encryption unit 118 in the content recording device 100 generates the transmission target stream. As shown in FIG. 7, the auxiliary information 30 includes management information 31, detailed segment information 32, detailed segment information 33, and digital copy control information 34.

The partial stream 20 shown in FIG. 6 is composed of two streams (10a, 10b) respectively for programs A and B which differ in video resolution, number of audio channels, presence or absence of subtitles, CCI, and the like. Therefore, this example of auxiliary information 30 includes two pieces of detailed segment information, 32 and 33. In other words, the number of pieces of detailed segment information included in auxiliary information for one partial stream equals N+1 (N≥0), N being the number of changes occurring in the partial stream to the video resolution, the number of audio channels, the presence or absence of subtitles, the CCI, and the like.

The management information 31 is management information on the entire partial stream 20. As shown in FIG. 7, the management information 31 includes the size of the entire auxiliary information, as well as the program title, genre, date and time of recording, channel information, broadcast type, and the like.

Note that while not particularly shown in the figures, the management information 31 includes pointers to each piece of detailed segment information (32, 33).

The detailed segment information 32 is information necessary for playing back the program A stream 10a and is composed of segment management information 35 and a time map 36.

The segment management information 35 includes a start PTS and an end PTS, which respectively indicate the playback start time and playback end time of the program A stream 10a PTS. The segment management information 35 also includes PIDs (Program Clock Reference (PCR) PIDs, video PIDs, audio PIDs, and subtitle PIDs), video coding information, audio coding information, a start SPN, and an end SPN.

The time map 36 lists a PTS and a corresponding SPN at each position at which random access to the program A stream 10a is possible (in this example, every 0.5 seconds). Resume, fast forward, and the like are possible by referring to the time map 36. Note that hereinafter, information composed of one PTS and of one SPN corresponding to the PTS is referred to as an "entry".

The detailed segment information 33 is information necessary for playing back the program B stream 10b and is composed of segment management information 37 and a time map 38. The segment management information 37 and the time map 38 are similar to the segment management information 35 and the time map 36, except for pertaining to the program B stream 10b. A description thereof is thus omitted.

The digital copy control information 34 is information necessary for recording (copying) the partial stream 20. For each segment of the partial stream 20 that includes different CCI, the digital copy control information 34 lists the top SPN of the segment, the CCI, and an Analog Protection System (APS) in association with each other.

The auxiliary information 30 is generated by a conventional method. The following is therefore a brief explanation of the method of generating the auxiliary information 30.

In the example of the partial stream 20 in FIG. 6, the demultiplexer 112 of the content recording device 100 transmits the video PESs (I-Pictures) 12a and 12b to the video analysis unit 113, the audio PESs 14a and 14b to the audio analysis unit 114, and the section (PSI) 11a, the section (SIT) 13a, the section (PSI) 11b, and the section (SIT) 13b to the section analysis unit 115.

In the embodiment, the subtitle PES is not used to generate the auxiliary information. Therefore, the subtitle PES 18a is not transmitted to any of the analysis units (113, 114, or 115).

The analysis units (113, 114, and 115) analyze information transmitted by the demultiplexer 112 and transmit acquired information to the auxiliary information generation unit 116. The auxiliary information generation unit 116 generates auxiliary information 30 set to the information transmitted by each analysis unit and stores the auxiliary information 30 in the auxiliary information storage unit 103.

Specifically, the video analysis unit 113 analyses the video PES packets transmitted by the demultiplexer 112 to acquire information necessary for decoding, such as the PTSs, coding type, resolution, frame rate, and the like to be set in the video coding information of the pieces of segment management information 35 and 37. The video analysis unit 113 also acquires pairs of a PTS and an SPN to be set in the time maps 36 and 38. The video analysis unit 113 then transmits the acquired information to the auxiliary information generation unit 116.

In the example in FIG. 6, the auxiliary information generation unit 116 sets the PTSs and the like acquired by analyzing the video PES (I-Picture) 12a in the video coding information of the segment management information 35 and sets the pairs of a PTS and an SPN acquired by analyzing the video PES (I-Picture) 12a in the time map 36. The auxiliary information generation unit 116 sets the PTSs and the like acquired by analyzing the video PES (I-Picture) 12b in the video coding information of the segment management information 37 and sets the pairs of a PTS and an SPN acquired by analyzing the video PES (I-Picture) 12b in the time map 38.

Furthermore, the auxiliary information generation unit 116 sets the start PTS and the end PTS of the pieces of segment management information 35 and 37, as well as the start SPN and the end SPN, based on the pairs of a PTS and an SPN transmitted by the video analysis unit 113.

The audio analysis unit 114 analyses the audio PESs transmitted by the demultiplexer 112 to acquire information necessary for decoding, such as the audio coding method, number of channels, sampling frequency, and the like to be set in the audio coding information of the pieces of segment management information 35 and 37. The audio analysis unit 114 then transmits the acquired information to the auxiliary information generation unit 116.

In the example in FIG. 6, the auxiliary information generation unit 116 sets the audio coding method and the like acquired by analyzing the audio PES 14a in the audio coding information of the segment management information 35 and sets the audio coding method and the like acquired by analyzing the audio PES 14b in the audio coding information of the segment management information 37.

The section analysis unit 115 analyses the sections transmitted by the demultiplexer 112 to acquire the title, genre, date and time of recording, channel information, broadcast type, and the like in the management information 31, as well as the PIDs in the pieces of segment management information 35 and 37 and the CCI of the digital copy control information 34. The section analysis unit 115 transmits the acquired information to the auxiliary information generation unit 116.

In the example in FIG. 6, the auxiliary information generation unit 116 sets the PIDs and the CCI acquired by analysis of the section (PSI) 11a as the PIDs of the segment management information 35 and a CCI level of the digital copy control information 34. The auxiliary information generation unit 116 sets the PIDs and the CCI acquired by analysis of the section (PSI) 11b as the PIDs of the segment management information 37 and a CCI level of the digital copy control information 34.

Note that the auxiliary information generation unit 116 sets each CCI level transmitted by the section analysis unit 115 in the digital copy control information 34 in association with a start SPN of the corresponding stream (the program A stream 10a or the program B stream 10b).

Since there is normally only one piece of management information 31 for one partial stream, in the example in FIG. 6, the auxiliary information generation unit 116 sets the title and the like of the management information 31 to be the title and the like of program A as acquired by the section analysis unit 115 analyzing the section it detects first between the sections (SIT) 13a and 13b, namely the section (SIT) 13a.

The auxiliary information generation unit 116 sets the size of the entire auxiliary information in the management information 31 when recording of the program is complete. Furthermore, when setting new detailed segment information, the auxiliary information generation unit 116 sets the number of pieces of detailed segment information in the management information 31 to indicate the number of pieces of detailed segment information included in the auxiliary information 30 at that point.

The resume position in the management information 31 is set when playback of a content pertaining to the auxiliary information 30 is suspended partway through. The method of setting the resume position is described in the <Operations> and <Playback> sections below.

<Transport Target Stream>

The following describes a transmission target stream 40.

Figure 8:
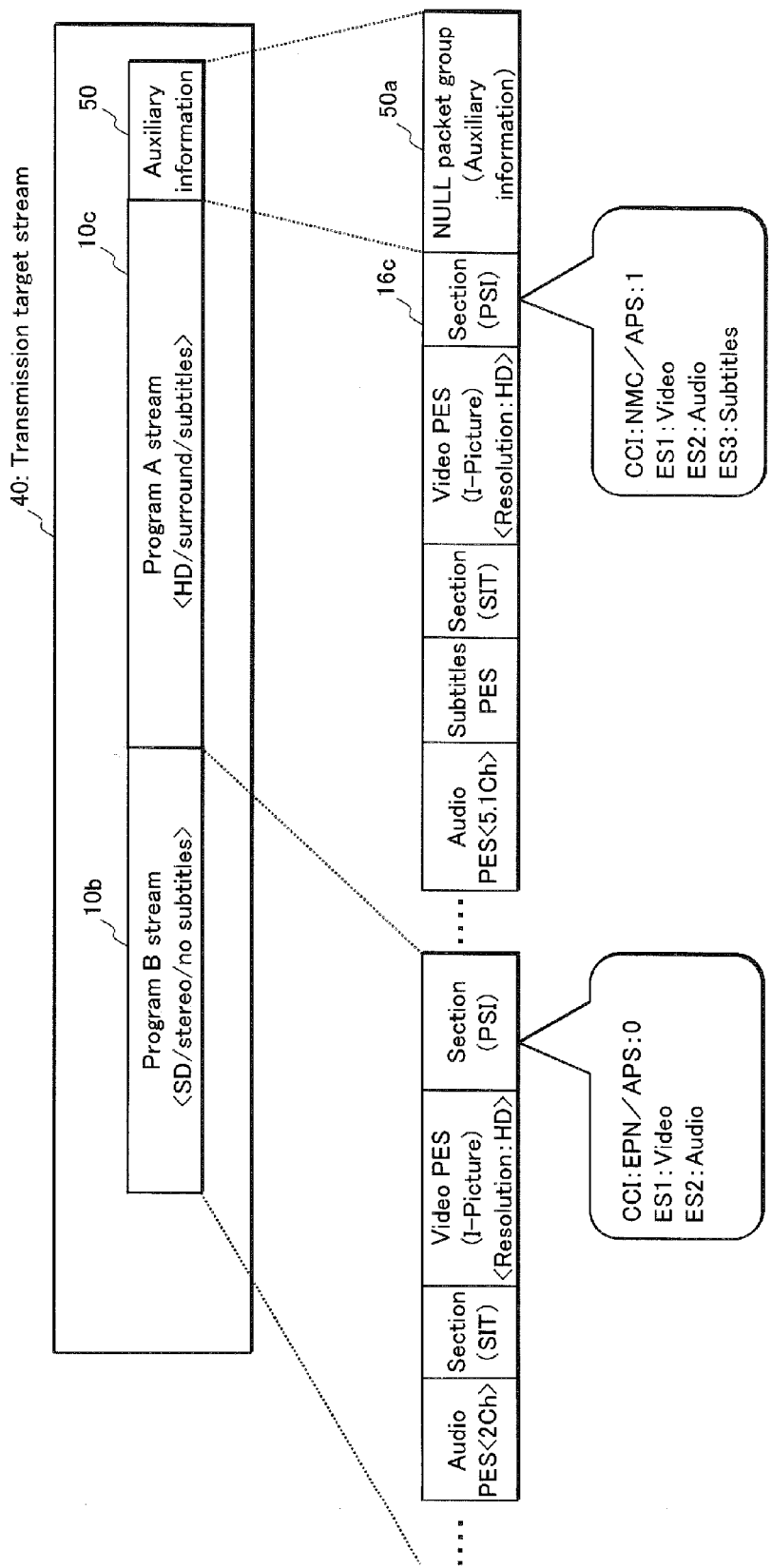
FIG. 8 shows an example of the data structure and content of a transmission target stream 40.

FIG. 8 shows an example of the data structure and content of the transmission target stream 40.

The transmission target stream 40 is composed of auxiliary information 50, a program A stream 10c, and a program B stream 10b.

The program A stream 10c and the program B stream 10b are examples of the first stream portion in the present invention. The auxiliary information 50 is an example of the second stream portion.

The auxiliary information 50 consists of TTS packets storing 184 byte sections of the auxiliary information 30 shown in FIG. 7, with the CCI associated with SPN "0" of the digital copy control information 34 having been changed from "COG" to "NMC" (hereinafter referred to as "auxiliary information 39"; see the NULL packet group 50a in FIG. 8). The PIDs of these TTS packets are set to different values than the PIDs of the TTS packets that store elements other than the auxiliary information 50 in the transmission target stream 40 (i.e. the program A stream 10*c* and the program B stream 10*b*).

The program A stream 10*c* is the program A stream 10*a* in the partial stream 20 of FIG. 6, with the section (PSI) 11*a* replaced by a section (PSI) 16*c*.

In the section (PSI) 16*c*, the setting of the CCI in the section (PSI) 11*a* is changed from "COG" to "NMC" (i.e. to copying being prohibited after one copy). The setting of the CCI is thus changed so that the program A stream 10*a*, which was set to "COG" (i.e. one generation of copies (copying one time) allowed) at the point at which the content recording device 100 recorded program A, is set to copying being prohibited after recording on the content storage/playback device 200. This prevents further copying from the content storage/playback device 200.

The program B stream 10*b* is the same as the program B stream 10*b* in the partial stream 20 shown in FIG. 6.

In the embodiment, the PID of each TTS packet composing the auxiliary information 50 is set to "0x1FFFF". In other words, the auxiliary information 39 is stored in NULL packets and transmitted.

This is advantageous in that a conventional content playback device having the function to receive a stream composed of the program A stream 10*c* and the program B stream 10*b* can play back each stream (10*c* and 10*b*) when receiving either the transmission target stream 40 or an encrypted transmission target stream 60, described below.

This is because a conventional content playback device discards the transmitted NULL packets that store the auxiliary information 39 and can therefore process the received streams in the same way as conventional streams.

In the embodiment, the content recording device 100 thus transmits a transmission target stream 40 that includes the auxiliary information 50 composed of NULL packets. This allows the content storage/playback device 200 to easily identify and acquire the TTS packets constituting the auxiliary information 50.

<NULL Packets>

The following describes how the auxiliary information 39 is stored in NULL packets, using an example of auxiliary information 39 having a data size of 2000 bytes.

Figure 9:
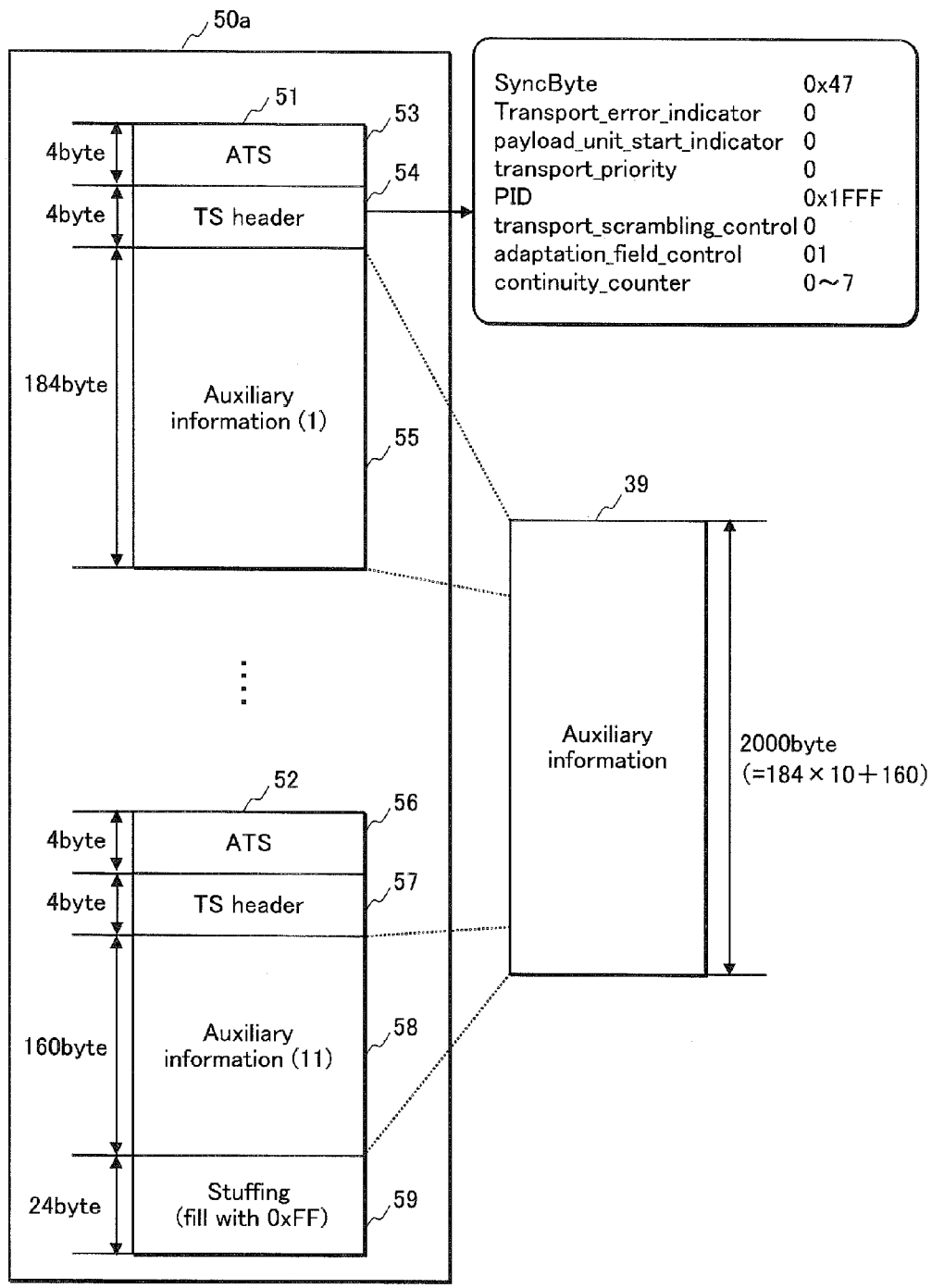
FIG. 9 shows NULL packets 50a storing auxiliary information 39.

FIG. 9 shows NULL packets 50*a* storing auxiliary information 39.

The NULL packets 50*a* are constituted by 11 NULL packets, including a NULL packet 51 and a NULL packet 52.

The NULL packet 51 is the first TTS packet to be transmitted and is composed of an ATS 53, a TS header 54, and auxiliary information (1) 55. The NULL packet 52 is the last (11$^{th}$) TTS packet to be transmitted and is composed of an ATS 56, a TS header 57, auxiliary information (11) 58, and stuffing 59.

The ATS 53, ATS 56, TS header 54, and TS header 57 are each four-byte pieces of data. As described above, the PID of the TS header 54 and the TS header 57 are set to "0x1FFF", indicating a NULL packet.

The auxiliary information (1) 55 is 184-byte data starting at the top of the auxiliary information 39. The auxiliary information (11) 58 is 160-byte data at the end of the auxiliary information 39.

The stuffing 59 is 24 bytes of data set to 0xFF to fill the remainder of the 160-byte auxiliary information (11) 58, so that the payload of the NULL packet 52 is the fixed length of 184 bytes.

Note that since the auxiliary information is variable-length data, stuffing is not necessary when the length of the auxiliary information is an integer multiple of 184 bytes.

<Encrypted Transmission Target Stream>

The following describes an encrypted transmission target stream 60 that the content recording device 100 transmits to the content storage/playback device 200.

Figure 10:
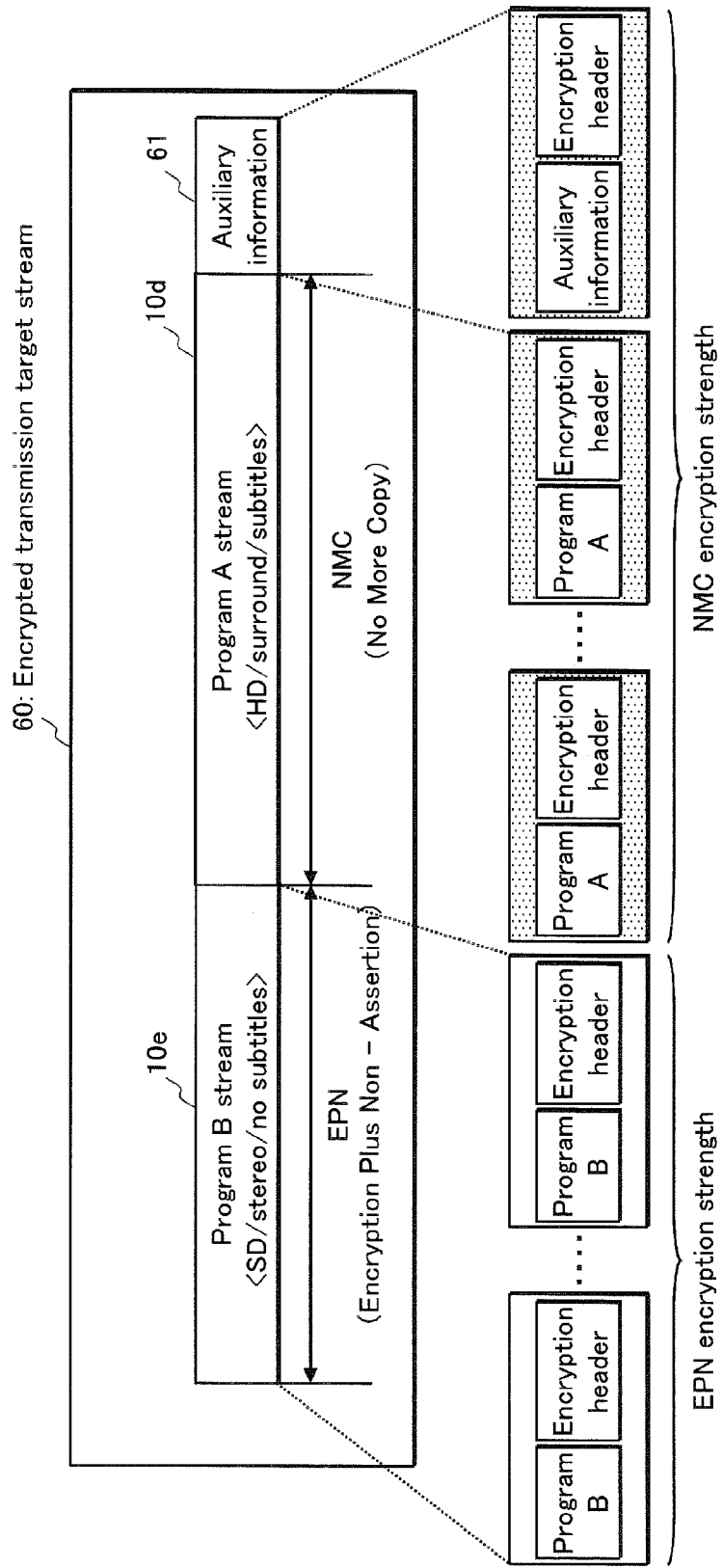
FIG. 10 shows an example of the data structure and content of an encrypted transmission target stream 60.

FIG. 10 shows an example of the data structure and content of the encrypted transmission target stream 60.

The transmission target stream 60 is composed of auxiliary information 61, a program A stream 10*d*, and a program B stream 10*e*. The transmission target stream 60 is transmitted in this order.

The program A stream 10*d* and the program B stream 10*e* are examples of the first stream portion in the present invention. The auxiliary information 61 is an example of the second stream portion.

The program A stream 10*d* is an encryption, in units of GOPs, of the program A stream 10*c* shown in FIG. 8 using an encryption method having a strength corresponding to the CCI level of the program A stream 10*c* (in this example, NMC).

The program B stream 10*e* is an encryption, in units of GOPs, of the program B stream 10*b* shown in FIG. 8 using an encryption method having a strength corresponding to the CCI level of the program B stream 10*b* (in this example, EPN).

In other words, the program A stream 10*d* is encrypted with a stronger encryption method than the program B stream 10*e*.

The encrypted packets constituting the program A stream 10*d* and the program B stream 10*e* are composed of a variable-length payload (in this example, in units of GOPs) to which an encryption header has been attached. Information indicating the encryption method and the like is set in the encryption header.

The auxiliary information 61 is an encryption of the auxiliary information 50 shown in FIG. 8. In other words, the auxiliary information 61 is composed of one encrypted packet.

The auxiliary information 61 is encrypted using the strongest encryption method among the encryption methods used to encrypt the other elements in the transmission target stream 60 (i.e. the program A stream 10*d* and the program B stream 10*e*). In other words, as described above, the auxiliary information 61 is encrypted using an encryption method of the same strength as for the program A stream 10*d* (i.e. an encryption method of a strength corresponding to NMC), since a stronger encryption method is used to encrypt the program A stream 10*d* than the program B stream 10*e*.

In the embodiment, as shown in FIG. 8, when the CCI level of the program A stream 10*c* is "NMC" and the CCI level of the program B stream 10*b* is "EPN", the program A stream 10*d* and the program B stream 10*e* are both encrypted. When the CCI level is "CF", however, the corresponding stream is not encrypted.

Furthermore, the auxiliary information is also not encrypted if, for example, the CCI is set to "CF" for the entire content (in this example, the content that includes program A and program B). In other words, if the CCI level of both the program A stream 10*c* and the program B stream 10*b* shown in FIG. 8 is "CF", the transmission target stream 40 is transmitted as is.

In the embodiment, the payload of the encrypted packets constituting the program A stream 10*d* and the program B stream 10*e* have been described as variable length (in this example, units of GOPs). A fixed-length encryption packet, however, may be used depending on the encryption method.

There is no particular limit on the encryption technology usable in the embodiment. A variety of Digital Right Management (DRM) methods may be used, such as Marlin, Windows (registered trademark) Media DRM (WMDRM), Digital Transmission Content Protection over Internet Protocol (DTCP/IP), and the like.

<Operations>

The following describes operations by the content recording device 100 and the content storage/playback device 200 in the embodiment.

<Overall Operations>

First, overall operations are described for transmission and reception of a transmission target stream from when the content recording device 100 receives a user instruction to transfer or copy a program until the content storage/playback device 200 finishes receiving the transmission target stream (40 or 60) for the program.

Figure 11:
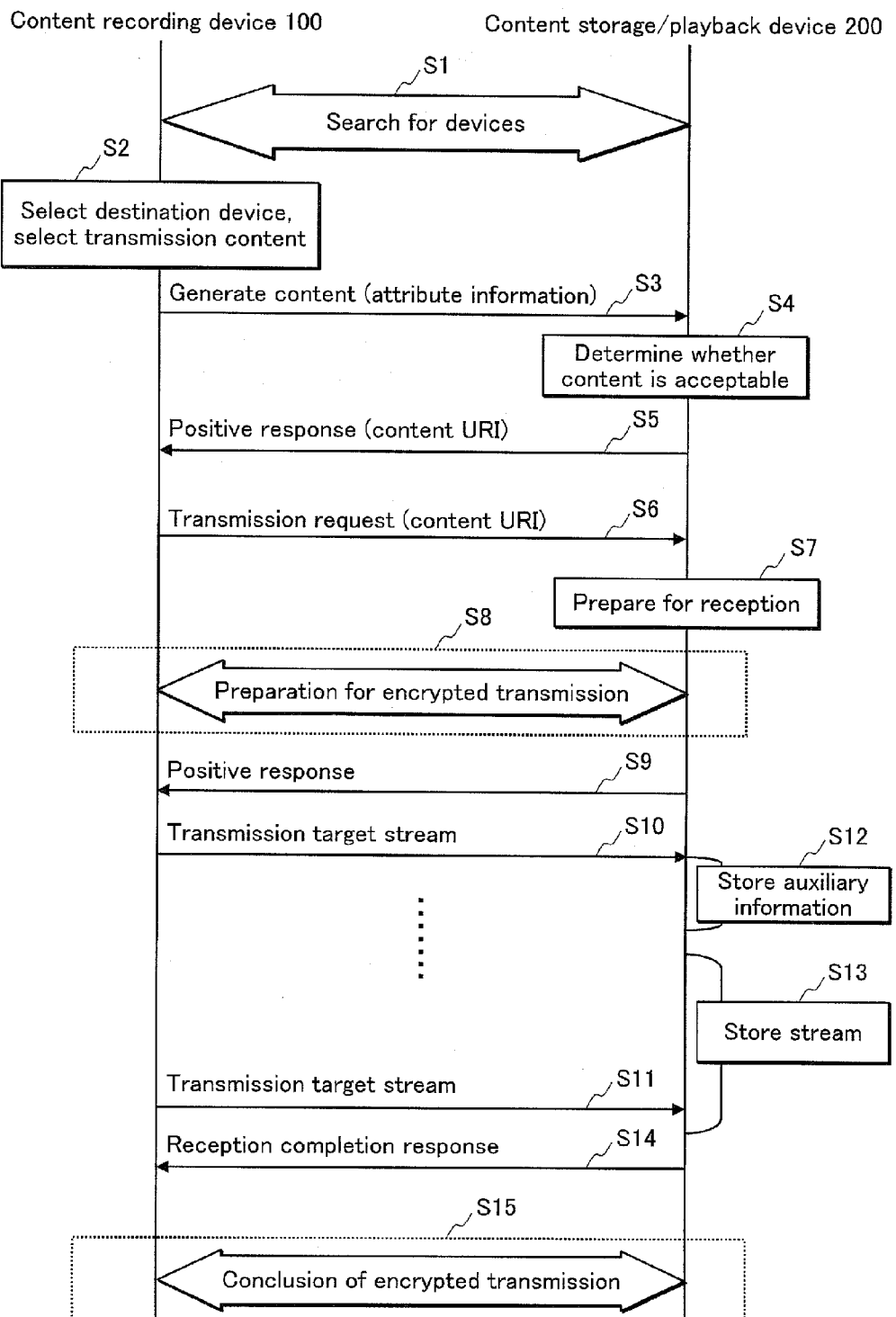
FIG. 11 is a sequence diagram showing transmission and reception of a transmission target stream between the content recording device 100 and the content storage/playback device 200.

FIG. 11 is a sequence diagram showing transmission and reception of a transmission target stream between the content recording device 100 and the content storage/playback device 200.

The processes enclosed within a dotted line in FIG. 11 (encrypted transmission preparation (step S8) and encrypted transmission conclusion (step S15)) are necessary when transmitting and receiving an encrypted transmission target stream, such as the transmission target stream 60. When transmitting and receiving an unencrypted transmission target stream, such as the transmission target stream 40, these processes are not necessary.

Upon receiving, via the user I/F 104, a user instruction to transfer or copy a program, the content transmission control unit 120 of the content recording device 100 instructs the transmission I/F 119 to search for candidate destination devices for the transmission target stream.

Upon receiving this instruction, the transmission I/F 119 searches for candidate destination devices for the transmission target stream by following the UPnP protocol to transmit, via the local network 1, a request message requesting a response from devices having the function to transfer or copy a program. The transmission I/F 119 then receives a response message from devices having this function (step S1).

In this example, the transmission I/F 119 only receives a response message from the content storage/playback device 200.

The content transmission control unit 120 receives, via the user I/F 104, a program transfer or copy start request indicating the destination device selected by the user (in this example, the content storage/playback device 200) and a recorded program selected by the user (in this example, a content composed of program A and program B) (step S2). The content transmission control unit 120 then instructs the stream generation/encryption unit 118 to transmit attribute information, such as the title and genre of the program, content size and format, existence of encrypted transmission, and the like based on the auxiliary information 30 for the selected program stored in the auxiliary information storage unit 103.

In accordance with this instruction, the stream generation/encryption unit 118 transmits the attribute information, via the transmission I/F 119, to the destination device selected by the user (in this example, the content storage/playback device 200) (step S3).

Note that in FIG. 7, while not particularly shown in the figure, the program format can be acquired from the management information 31 in the auxiliary information 30, or from the video coding information and the audio coding information in the pieces of segment management information (35, 37) in the auxiliary information 30.

Furthermore, the existence of encrypted transmission can be determined by referring to each CCI level in the digital copy control information 34 of the auxiliary information 30. Specifically, among the CCI levels, if any CCI level is set to a value other than "CF", encrypted transmission is present. Conversely, if all of the CCI levels are set to "CF", no encrypted transmission is present.

The stream decryption/analysis unit 206 in the content storage/playback device 200, which has received the attribute information, determines whether the content storage/playback device 200 can handle the content to be transmitted (hereinafter, such a content being referred to as an "acceptable content") based on the content format and the existence of encrypted transmission as included in the attribute information (step S4).

If the content is not acceptable, the stream decryption/analysis unit 206 transmits an indication indicating non-acceptability to the content recording device 100 via the transmission I/F 205. The content recording device 100 and the content storage/playback device 200 then terminate processing for transmission and reception of the transmission target stream.

On the other hand, if the content is acceptable, the stream decryption/analysis unit 206 transmits a positive response with a content Uniform Resource Identifier (URI) attached thereto to the content recording device 100 via the transmission I/F 205 (step S5).

The content URI is composed of an identifier for the content storage/playback device 200 (such as an IP address or a combination of host name and TCP port number) and a character sequence that indicates a content identifier or the like. The content identifier is generated by the content storage/playback device 200 so that the content storage/playback device 200 can uniquely identify the content.

The stream decryption/analysis unit 206 stores the generated content identifier in association with the attribute information received in step S3.

The content transmission control unit 120 of the content recording device 100 that received the positive response transmitted in step S5 transmits a transmission request to the content storage/playback device 200 via the transmission I/F 119 (step S6). The transmission request has attached thereto the content URI that is attached to the received positive response.

The stream decryption/analysis unit 206 of the content storage/playback device 200, which received the transmission request, prepares to receive the transmission target stream by performing operations based on the attribute information stored in association with the content identifier included in the content URI attached to the transmission request. Such operations include checking on the content format and existence of encrypted transmission, and guaranteeing a storage region in the HDD (step S7).

Note that when encrypted transmission is required, the stream decryption/analysis unit 206 further prepares to receive the transmission target stream by preparing for encrypted transmission via license authentication, key exchange, and the like with the content recording device 100 (step S8).

Upon completion of preparation to receive the transmission target stream, the stream decryption/analysis unit 206 transmits a positive response to the content recording device 100 (step S9).

The processing described in steps S10-S13 below is now described briefly. A more detailed description is provided later (see FIGS. 11 and 12).

The content transmission control unit 120 of the content recording device 100, which received the positive response, instructs the stream generation/encryption unit 118 to generate and transmit the transmission target stream for the program selected by the user.

Having received this instruction, the stream generation/encryption unit 118 reads the auxiliary information 30 stored in the auxiliary information storage unit 103 and the partial stream 20 stored in the stream storage unit 102 and, depending on whether encrypted transmission is present, sequentially generates either the transmission target stream 40 or 60 and sequentially transmits the generated transmission target stream (40 or 60) via the transmission I/F 119 (steps S10-S11).

Having started to receive the transmission target stream, the stream decryption/analysis unit 206 of the content storage/playback device 200 stores the auxiliary information and the partial stream included in the transmission target stream respectively in the auxiliary information storage unit 203 and the stream storage unit 202 (step S12-S13).

Upon completion of reception of the transmission target stream, the stream decryption/analysis unit 206 of the content storage/playback device 200 transmits a reception completion response to the content recording device 100 via the transmission I/F 205 (step S14).

In the case of encrypted transmission (i.e. when the processing in step S8 is performed), the stream decryption/analysis unit 206 then performs processing for conclusion of encrypted transmission with the content recording device 100 (step S15). The content recording device 100 and the content storage/playback device 200 thus conclude transmission and reception of the transmission target stream.

While not particularly shown in the figures, the content recording device 100 then reduces the number of permissible copies of the content as necessary. Furthermore, the content storage/playback device 200 performs processing to place the transferred or copied program in a playable state (for example, adding the program to a recorded program list) and, in response to a user playback request or the like, plays the program back.

<Generation and Transmission>

The following describes the processing in steps S10-S11 of FIG. 11, using the example of generating and transmitting the transmission target stream 60.

Figure 12:
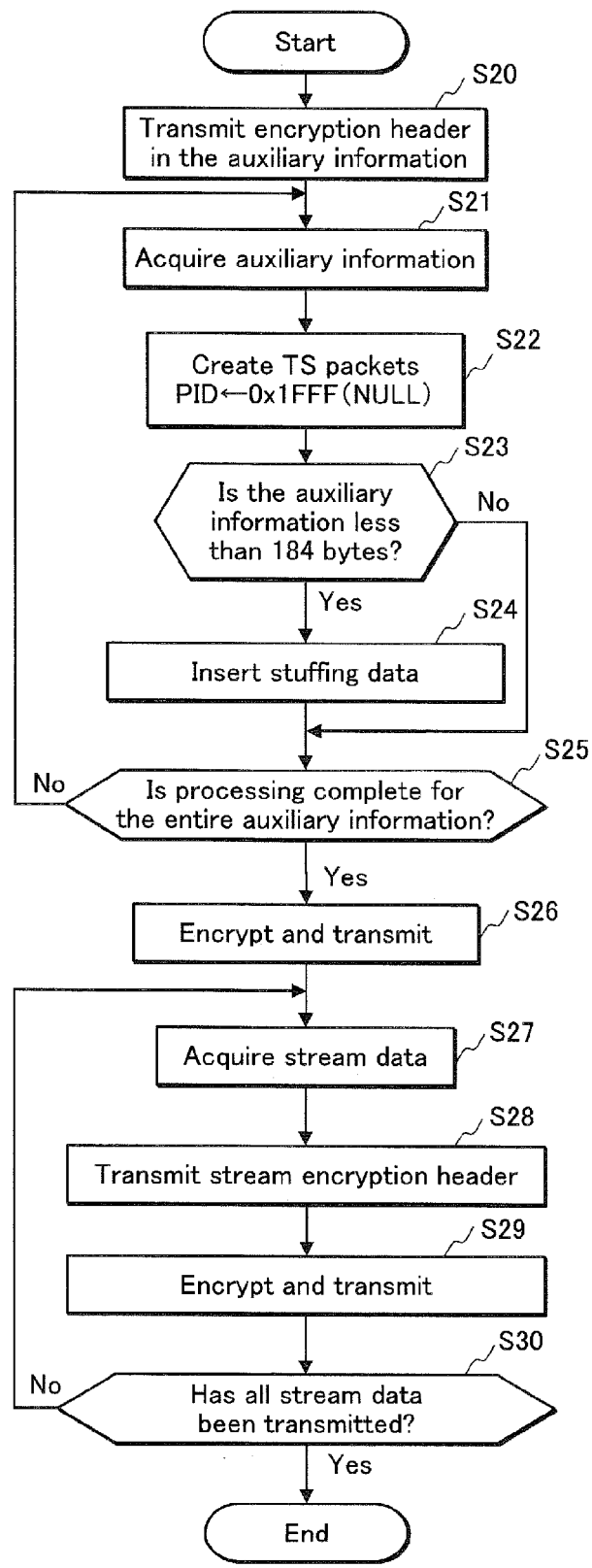
FIG. 12 is a flowchart showing processing by the content recording device 100 to generate and transmit the transmission target stream 60.

FIG. 12 is a flowchart showing processing by the content recording device 100 to generate and transmit the transmission target stream 60.

Based on an instruction from the content transmission control unit 120, the stream generation/encryption unit 118 in the content recording device 100 reads the auxiliary information 30 for the user-selected program from the auxiliary information storage unit 103. The stream generation/encryption unit 118 then generates auxiliary information 39 by changing the CCI corresponding to the SPN "0" in the digital copy control information 34 of the auxiliary information 30 from "COG" to "NMC".

Furthermore, the stream generation/encryption unit 118 transmits the encryption header of the encrypted packets in the auxiliary information to the content storage/playback device 200 via the transmission I/F 119 (step S20).

The stream generation/encryption unit 118 receives the auxiliary information 39 in 184-byte units (step S21). The stream generation/encryption unit 118 then generates a TTS packet whose payload is set to the acquired 184-byte data and whose TS header is set to a PID of "0x1FFF", a value indicating a NULL packet (step S22).

The stream generation/encryption unit 118 determines whether the data acquired in step S21 is less than 184 bytes (step S23).

In the example of auxiliary information 39 shown in FIG. 9, the first through tenth TTS packets are determined as not being less than 184 bytes (step S23: No). For the 11$^{th}$ TTS packet (NULL packet 52), on the other hand, the acquired data is determined as being less than 184 bytes (step S23: Yes).

When it is determined that the data acquired in step S21 is less than 184 bytes (step S23: Yes), the stream generation/encryption unit 118 inserts stuffing bytes (0xFF) between the end of the data acquired in step S21, which has been set to the payload of the TTS packet generated in step S22, and the end of the payload (step S24). The stream generation/encryption unit 118 then determines whether generation of TTS packets for the entire auxiliary information 39 is complete (step S25).

On the other hand, in step S23, when it is determined that the data acquired in step S21 is not less than 184 bytes (step S23: No), the determination in step S25 is made.

In step S25, if generation of TTS packets for the entire auxiliary information 39 is not complete (step S25: No), processing is repeated starting from step S21. If generation of TTS packets for the entire auxiliary information 39 is complete (step S25: Yes), all of the generated TTS packets are encrypted and transmitted to the content storage/playback device 200 via the transmission I/F 119 (step S26).

Note that the TTS packets are encrypted using an encryption method with a strength corresponding to the strongest restriction level among the CCI levels that are set in the digital copy control information of the auxiliary information 39.

Next, the stream generation/encryption unit 118 reads the partial stream 20 from the stream storage unit 102 for the program selected by the user.

The stream generation/encryption unit 118 generates a partial stream by changing the value of the CCI set in the section (PSI) 11a of the program A stream 10a in the partial stream 20 from "COG" to "NMC" (hereinafter referred to as "changed partial stream").

The stream generation/encryption unit 118 acquires the changed partial stream in units of GOPs (step S27) and transmits the encryption header of the encrypted packets for the data in units of GOPs to the content storage/playback device 200 via the transmission I/F 119 (step S28).

Furthermore, the stream generation/encryption unit 118 refers to the digital copy control information of the auxiliary information 39 to encrypt the data in units of GOPs acquired in step S27 using an encryption method with a strength corresponding to the CCI of the segment to which the data in units of GOPs acquired in step S27 belongs. The stream generation/encryption unit 118 then transmits the encrypted data to the content storage/playback device 200 via the transmission I/F 119 (step S29).

The stream generation/encryption unit 118 determines whether transmission of the entire changed partial stream is complete (step S30). When transmission of the entire changed partial stream is not complete (step S30: No), processing is repeated starting from step S27.

On the other hand, when transmission of the entire changed partial stream is complete (step S30: Yes), the stream generation/encryption unit 118 transmits a packet with a chunk size of zero to the content storage/playback device 200 via the transmission I/F 119 to indicate the end of the stream. Processing for generation and transmission thus concludes.

In the example above of generating and transmitting the transmission target stream 60, processing for generation and transmission by the content recording device 100 has been described as including encryption in step S26 and step S29.

When encryption is not necessary (i.e. when the CCI is set to "CF" for the entire content), processing for encryption is of course not performed.

In other words, in step S26, all of the TTS packets generated in step S22 (including the TTS packets into which stuffing bytes were inserted in step S24) are transmitted as is without encryption. Furthermore, in step S29, the data acquired in step S27 (the TTS packets) is also transmitted without encryption. Finally, the processing in steps S20 and S28 is not performed.

<Reception>

The following describes the processing in steps S12-S13 of FIG. 11, using the example of receiving the transmission target stream 60.

Figure 13:
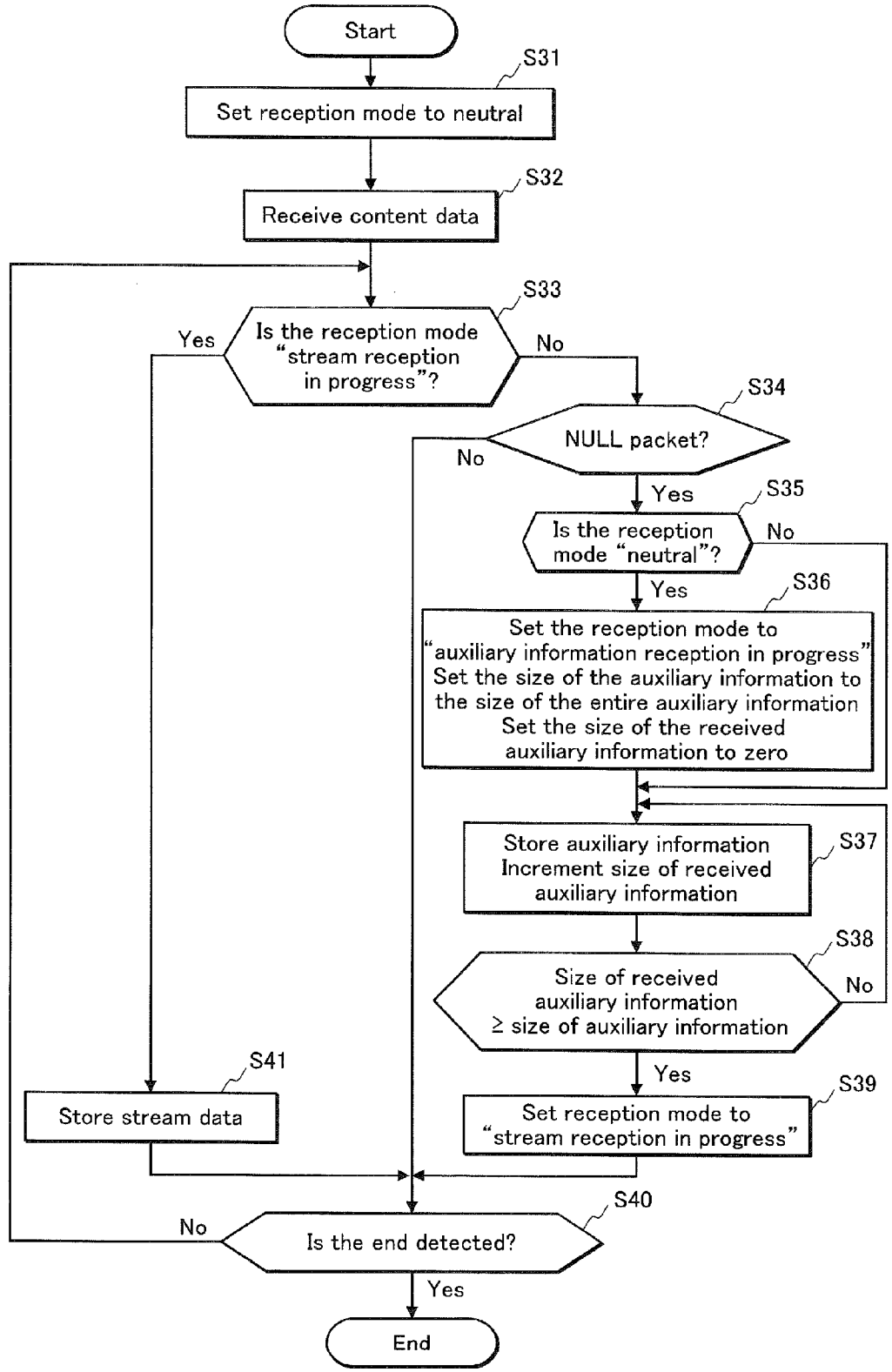
FIG. 13 is a flowchart showing processing by the content storage/playback device 200 to receive the transmission target stream 60.

FIG. 13 is a flowchart showing processing by the content storage/playback device 200 to receive the transmission target stream 60.

The transmission I/F 205 of the content storage/playback device 200 sets information indicating which type of data in the transmission target stream (auxiliary information or partial stream) is being received (hereinafter, "reception mode") to an initial value (hereinafter, "neutral") (step S31).

Note that the reception mode is stored in the memory of the content storage/playback device 200. By accessing this memory, the transmission I/F 205 and the stream decryption/analysis unit 206 can refer to and update the reception mode.

The size of the auxiliary information and the size of the received auxiliary information, described below, are also stored in this memory. These sizes can be referred to and updated.

Next, the transmission I/F 205 receives an encrypted packet (step S32).

The stream decryption/analysis unit 206 determines whether the reception mode indicates "stream reception in progress", which indicates that the partial stream is being received (step S33).

Immediately after the processing in step S31, the reception mode is set to "neutral", and therefore the stream decryption/analysis unit 206 determines that the reception mode is not "stream reception in progress" (step S33: No). The stream decryption/analysis unit 206 then receives and decrypts an encrypted packet from the transmission I/F 205 and determines whether the top TTS packet among the obtained TTS packets is a NULL packet by determining whether the PID of the TTS packet is "0×1FFF" (step S34).

If the PID of the TTS packet is "0×1FFF", the TTS packed is determined to be a NULL packet (step S34: Yes). The stream decryption/analysis unit 206 then determines whether the reception mode is "neutral" (step S35).

If the reception mode is "neutral" (step S35: Yes), the stream decryption/analysis unit 206 updates the reception mode to "auxiliary information reception in progress", which indicates that the auxiliary information is being received. The stream decryption/analysis unit 206 then acquires the size of the entire auxiliary information by referring to the payload of the top TTS packet, stores the size of the auxiliary information in the memory, and initializes the size of the received auxiliary information to "0" (step S36).

When processing in step S36 is complete, or when the reception mode in step S35 is not "neutral" (step S35: No), the stream decryption/analysis unit 206 selects, in order from the top of the TTS packets obtained in step S34, a TTS packet for which the processing in step S37 has not yet been performed. The stream decryption/analysis unit 206 then acquires the data of the auxiliary information 39 included in the payload of the selected TTS packet, stores the data in the auxiliary information storage unit 203, and increments the size of the received auxiliary information in the memory by the size of the data (step S37).

The stream decryption/analysis unit 206 determines whether the size of the received auxiliary information is at least the size of the auxiliary information (step S38).

In the example of the auxiliary information 39 shown in FIG. 9, when the first through the tenth TTS packets are being processed, the size of the received auxiliary information is determined to be less than the size of the auxiliary information (step S38: No). When the 11'h TTS packet is being processed, the size of the received auxiliary information is determined to be at least the size of the auxiliary information (step S38: Yes).

If the size of the received auxiliary information is determined to be less than the size of the auxiliary information (step S38: No), the stream decryption/analysis unit 206 performs the processing from step S37 again. If the size of the received auxiliary information is at least the size of the auxiliary information (step S38: Yes), reception of the entire auxiliary information 39 is complete, and therefore the stream decryption/analysis unit 206 updates the reception mode to "stream reception in progress" (step S39).

When step S39 is complete, the transmission I/F 205 receives a new packet and determines whether the end of the stream has been detected based on whether the received packet has a chunk size of zero (step S40).

If the chunk size of the received packet is not zero, the transmission I/F 205 determines that the packet is not at the end of the stream (step S40: No) and performs processing again starting from step S33.

Immediately after performing step S39, since the reception mode is "stream reception in progress" (step S33: Yes), the stream decryption/analysis unit 206 receives and decrypts an encrypted packet from the transmission I/F 205 and stores the obtained TTS packets in the stream storage unit 202 (step S41).

Next, in step S40, the transmission I/F 205 receives a new packet. If the chunk size of the received packet is not zero, the transmission I/F 205 determines that the packet is not at the end of the stream (step S40: No) and performs processing again starting from step S33. If the chunk size of the received packet is zero, the transmission I/F 205 determines that the packet is at the end of the stream (step S40: Yes) and the content storage/playback device 200 concludes processing for reception.

<Playback Processing>

The following is a brief description of processing by the content storage/playback device 200 to play back a program (content) after the above reception processing is complete.

<Normal Playback, Resume Playback>

First, normal playback and resume playback of a program (content) are described.

The playback control unit 215 of the content storage/playback device 200 receives, via the I/F 211, a user playback request to play back a designated program.

The playback control unit 215 instructs the auxiliary information management unit 212 to read the auxiliary information (in this example, the auxiliary information 39) for the program designated by the received playback request (in this example, the program in the transmission target stream 60 (a program composed of program A and program B)). The playback control unit 215 then acquires the management information 31 included in the read auxiliary information 39.

The playback control unit 215 determines whether a resume position is set in the acquired management information 31. If no resume position is set, playback should start from the top of the program designated by the received playback request, i.e. the top of the program A stream 10c. Therefore, the playback control unit 215 acquires the detailed segment information 32 included in the read auxiliary information 39.

The playback control unit 215 sets, in the stream decoder 213, each PID (video PID, audio PID, subtitle PID), the video coding information, and the audio coding information located in the segment management information 35 of the acquired detailed segment information 32.

The playback control unit 215 instructs the stream decoder 213 to begin regular playback, designating the start SPN and the end SPN of the segment management information 35.

The stream decoder 213 reads stream data from the stream storage unit 202, starting with stream data at the designated start SPN until stream data at the designated end SPN. Using a preset video PID, audio PID, and subtitle PID, the stream decoder 213 demultiplexes the MPEG2-TS packets and then decodes the video, audio, and subtitles in accordance with the set coding information.

The stream decoder 213 transmits the decoded video, audio, and subtitles to the AV output unit 214. The AV output unit 214 outputs the data to the display device 3 over the HDMI cable in compliance with HDMI standards.

Subsequently, the stream decoder 213 continues the above processing until receiving an instruction from the playback control unit 215 to stop regular playback. Playback of a program designated by the user playback request thus continues.

Upon receiving an instruction to stop playback from the user via the I/F 211, the playback control unit 215 instructs the stream decoder 213 to pause playback.

Upon receiving the instruction to pause playback, the stream decoder 213 immediately stops decoding and transmits the PTS indicating the stop position to the playback control unit 215.

The playback control unit 215 sets the PTS received from the stream decoder 213 as the resume position in the management information 31.

Playback from the resume position (resume playback) is thus possible upon receipt of a user playback request designating the same program (in this example, the program composed of program A and program B).

In other words, if a user playback request designating the same program is received, then the playback control unit 215 determines affirmatively when determining whether a resume position is set in the acquired management information 31 as described above. Therefore, instead of instructing the stream decoder 213 to start regular playback from the start SPN in the segment management information 35, as in the case above, the playback control unit 215 instructs the stream decoder 213 to perform regular playback as described below.

Specifically, via the auxiliary information management unit 212, the playback control unit 215 acquires the time maps 36 and 38 included in the auxiliary information 39 and acquires, from the time maps 36 and 38, the SPN corresponding to the PTS closest to the PTS set in the resume position of the management information 31.

The playback control unit 215 instructs the stream decoder 213 to start regular playback from the acquired SPN.

The stream decoder 213 then performs the above processing on the stream data starting with stream data at the designated start SPN until stream data at the end SPN.

Note that if playback of the requested program continues to the end without receipt of an instruction to stop playback from the user, the playback control unit 215 clears the resume position in the management information 31. As a result, playback from the start of the program is possible upon receipt of a user playback request designating the same program (in this example, the program composed of program A and program B).

<Fast-Forward>

Next, fast-forwarding of a program (content) is described.

Upon receiving a fast-forward request from the user via the I/F 211 during playback of a program, the playback control unit 215 in the content storage/playback device 200 instructs the stream decoder 213 to pause playback.

The fast-forward request includes an indication of a fast-forward speed (2×, 10×, or the like).

Upon receiving the instruction to pause playback, the stream decoder 213 immediately stops decoding and transmits the PTS indicating the stop position to the playback control unit 215.

The playback control unit 215 acquires the time maps 36 and 38 included in the auxiliary information 39 in the auxiliary information management unit 212. Then, from the time maps 36 and 38, the playback control unit 215 acquires the SPN of the next entry after the entry that includes the PTS closest to the received PTS.

The playback control unit 215 instructs the stream decoder 213 to play back the I-Picture designated by the acquired SPN. When playback of this I-Picture is complete, the stream decoder 213 notifies the playback control unit 215 of completion of playback.

In accordance with the fast-forward speed designated by the fast-forward request from the user, the playback control unit 215 adjusts the interval between the I-Picture and the next I-Picture to be decoded. The playback control unit 215 then acquires the SPN of the next entry from the time maps and instructs the stream decoder 213 to play back the I-Picture designated by the acquired SPN.

Subsequently, the playback control unit 215 and the stream decoder 213 repeat similar processing until either reaching the end of the program (content) whose playback was requested or until receiving a stop playback request from the user.

In the above-described way, the content storage/playback device 200 can play back a content based on the auxiliary information included in the transmission target stream transmitted by the content recording device 100. Unlike a conventional content playback device, the content storage/playback device 200 therefore does not need to analyze the partial stream included in the transmission target stream to generate auxiliary information.

In other words, when a user requests to start transferring or copying a program, the content storage/playback device 200 shortens the time from the start of transmission of a transmission target stream until the start of playback of the program (content) as compared to a conventional content playback device.

Furthermore, as in the case of the transmission target stream 60, the auxiliary information may also be encoded and transmitted. This helps to prevent illegal copying of content through tampering with the auxiliary information.

<Supplementary Explanation>

While a transmission control device and a reception control device according to an embodiment of the present invention have been described, the following modifications are possible. The present invention is in no way limited to the transmission control device and the reception control device described in the embodiment.

(1) In the embodiment, the transmission control device 110 is described as receiving the content stream of a digital broadcast program via the television antenna 2. The content stream may be acquired from an external source, however, via a different method. For example, the content stream may be acquired from a server on the Internet.

In the embodiment, the partial stream recorded in the stream storage unit 102 has been described as being generated by the demultiplexer 112 extracting, from the MPEG2-TS stream output by the selection unit 101, TS packets corresponding to the service ID designated by the stream recording control unit 106 and attaching an ATS to the top of each extracted TS packet. The partial stream may, however, be re-encoded. In this case, the PID of the SIT shown in FIG. 5 may be changed for example to "010".

(2) In the embodiment, the transmission control device 110 has been described as generating the auxiliary information 30 necessary for playback and recording of the content. The transmission control device 110 may, however, generate only auxiliary information A necessary for playback of the content, or auxiliary information B necessary for recording of the content, and then generate the transmission target stream based on the generated auxiliary information (either A or B).

For example, when only auxiliary information A or auxiliary information B is generated, the content storage/playback device 200 needs to generate the remaining auxiliary information (auxiliary information B or A). As compared to generation of the entire auxiliary information, however, the processing load is reduced. The time from when the transmission control device 110 starts transmitting the transmission target stream until the time when the recorded content is ready for playback is therefore shortened.

It is possible, for example, for the transmission control device 110 to generate only the digital copy control information 34 (corresponding to the auxiliary information B) in the auxiliary information 30 shown in FIG. 7. In this case, the content storage/playback device 200 analyzes the program A and program B streams included in the received transmission target stream to generate the management information 31 and the pieces of detailed segment information 32 and 33 (corresponding to the auxiliary information A).

(3) In the embodiment, the auxiliary information has been described as being located at the top of the transmission target stream, but the location is not limited in this way. For example, the auxiliary information may be located at the end of the transmission target stream, collected at any position within the transmission target stream, or divided up across the transmission target stream.

However, when the auxiliary information is located at the top of the transmission target stream, playback from the top of the next content may be started even before reception of the entire transmission target stream is complete. This shortens the time from the start of transmission of the transmission target stream until the start of playback of the content. In this respect, positioning the auxiliary information at the top of the transmission target stream is advantageous as compared to positioning the auxiliary information at the end of or at one or more locations within the transmission target stream.

(4) In the embodiment, the transmission control device 110 has been described as storing and transmitting the auxiliary information in TTS packets.

Alternatively, a transmission target stream (including an encrypted transmission target stream) may be transmitted after being generated from (i) auxiliary information in a different stream format, such as MPEG-PS (Program Stream) format, or a different data format, and (ii) a changed partial stream.

(5) In the embodiment, the transmission control device 110 has been described as setting the PID of the TTS packets storing the generated auxiliary information to a PID indicating a NULL packet before transmitting the TTS packets. However, transmission via a different method is possible, as long as the TTS packets constituting the transmission target stream can be distinguished from the TTS packets storing the auxiliary information.

For example, information may be added to TTS packets storing the generated auxiliary information to indicate that the TTS packets include the auxiliary information. Alternatively, the PIDs of TTS packets storing the generated auxiliary information may be set to different PIDs than the PIDs of the TTS packets constituting the changed partial stream included in the transmission target stream. Note that in this case, the content storage/playback device may be notified in advance of the PIDs of the TTS packets storing the generated auxiliary information.

(6) In the embodiment, the content storage/playback device 200 has been described as connected to an HDMI compatible display device 3. The content storage/playback device 200 may, however, be connected to a display device that is not HDMI compatible.

In this case, the AV output unit 214 of the content storage/playback device 200 would need to be modified to include a Digital to Analog (D/A) converter that converts the uncompressed digital data, such as RGB or PCM, obtained by the stream decoder 213 into an electric signal (analog signal) corresponding to the input format of the connected display device. The electric signal would then be output to the display device.

The playback control unit 215 of the content storage/playback device 200 may also be modified so that when outputting the electronic signal, a copy prohibition signal at the time of analog output is set based on an Analog Protection System (APS) corresponding to the playback positions included in the digital copy information of the auxiliary information.

(7) The transmission control device and the reception control device in the embodiment are typically achieved as a Large Scale Integration (LSI), a type of semiconductor integrated circuit. These devices may respectively be made into discrete chips, or part or all of the devices may be made into one chip. Although referred to here as an LSI, depending on the degree of integration, the terms IC, system LSI, super LSI, or ultra LSI are also used.

In addition, the method for assembling integrated circuits is not limited to LSI, and a dedicated communication circuit or a general-purpose processor may be used. A Field Programmable Gate Array (FPGA), which is an LSI that can be programmed after manufacture, or a reconfigurable processor, which is an LSI whose connections between internal circuit cells and settings for each circuit cell can be reconfigured, may be used.

Additionally, if technology for integrated circuits that replaces LSIs emerges, owing to advances in semiconductor technology or to another derivative technology, the integration of functional blocks may naturally be accomplished using such technology. The application of biotechnology or the like is possible.

(8) Programs that cause a Central Processing Unit (CPU) to execute the processing performed by the transmission control device and the reception control device of the embodiment (see FIGS. 11-13) may be circulated and distributed across a variety of transmission channels or by being recorded on a recording medium.

Examples of such a recording medium include an Integrated Circuit (IC) card, optical disc, flexible disk, Read Only Memory (ROM), flash memory, and a hard disk.

The circulated and distributed programs are used by being stored in a memory readable by a CPU within a device. The CPU then executes the programs in order for the transmission control device and the reception control device in the embodiment to achieve their functions.

(9) A combination of some or all of the above modifications (1)-(8) may be applied to the transmission control device and the reception control device in the embodiment.

(10) The following further describes examples of a transmission control device and a reception control device according to aspects of the present invention, as well as modifications thereto and advantageous effects thereof.

(a) A transmission control device according to an aspect of the present invention comprises: a generation unit operable to generate, based on a content stream acquired from an external source, auxiliary information necessary for at least one of recording and playback of a content in the content stream; and a transmission unit operable to transmit a transmission target stream to an external device, the transmission target stream composed of a first stream portion based on the content stream and a second stream portion based on the auxiliary information generated by the generation unit.

With the above structure, the transmission control device according to this aspect of the present invention generates auxiliary information necessary for at least one of recording and playback of the content and transmits the transmission target stream to the external device, the transmission target stream composed of the first stream portion based on the content stream acquired from an external source and the second stream portion based on the generated auxiliary information.

The external device that receives the transmission target stream can acquire the auxiliary information from the second stream portion, thereby reducing the processing load as compared to when generating the entire auxiliary information necessary for recording and playback of the content.

Accordingly, with this transmission control device, the time from the start of transmission of the transmission target stream until the time when the content is recorded on the external device and is ready for playback is shortened.

(b) The content stream and the transmission target stream may each be a transport stream (TS), and the transmission unit may transmit the transmission target stream after attaching an identifier to each of one or more TS packets constituting the second stream portion, the identifier indicating that the TS packet includes data based on the auxiliary information.

With this structure, the external device can more easily acquire the auxiliary information from the transmission target stream by acquiring, from among the TS packets that are transmitted by the transmission control device and that constitute the transmission target stream, the TS packets having attached thereto the identifier indicating that the TS packet includes data based on the auxiliary information.

(c) As the identifier, the transmission unit may attach a packet identifier (PID) to each of the one or more TS packets constituting the second stream portion, the PID differing from a PID of each TS packet constituting the first stream portion.

With this structure, the external device can more easily acquire the auxiliary information from the transmission target stream by acquiring, from among the TS packets that are transmitted by the transmission control device and that constitute the transmission target stream, the TS packets having attached thereto the PID that differs from the PID of each TS packet constituting the first stream portion.

(d) The PID attached by the transmission unit to each TS packet constituting the second stream portion may indicate that the TS packet is a NULL packet, and the auxiliary information may be information necessary for both recording and playback of the content.

In this context, the PID indicating a NULL packet is "0x1FFFF".

With this structure, the external device can more easily acquire the auxiliary information from the transmission target stream by acquiring, from among the TS packets that are transmitted by the transmission control device and that constitute the transmission target stream, the TS packets having attached thereto the PID that indicates a NULL packet.

Furthermore, a conventional content playback device that receives the content stream and plays back the content typically discards received TS packets that are NULL packets.

Accordingly, when the transmission control device according to this aspect of the present invention transmits a transmission target stream to a conventional content playback device, the conventional content playback device only receives the first stream portion among the transmission target stream. Therefore, the conventional content playback device can still play content back normally, as when receiving a content stream.

Furthermore, with this transmission control device, since the auxiliary information is information necessary for both recording and playback of the content, the external device that receives the transmission target stream can acquire the auxiliary information from the second stream portion without analyzing the first stream portion.

Accordingly, with this transmission control device, the time from the start of transmission of the transmission target stream until the time when the content is recorded on the external device and is ready for playback is further shortened.

(e) The auxiliary information may include control information for performing copy control in accordance with a restriction level pertaining to recording of the content on the external device, and the TS packets constituting the second stream portion may be encrypted based on the control information.

With this transmission control device, the TS packets constituting the second stream portion are encrypted before transmission. This helps prevent the control information, included in the auxiliary information for performing control in accordance with a restriction level pertaining to recording of the content, from being tampered with during transmission for the purpose of making a malicious copy of the content.

(f) The content may be composed of a plurality of partial contents, the control information may be a setting of Copy Control Information (CCI) for each partial content, and the transmission unit may perform the encryption using an encryption method corresponding to a setting of the CCI, among settings of the CCI for each of the partial contents, that is most restrictive.

With this transmission control device, the TS packets constituting the second stream portion are encrypted using an encryption method corresponding to the most restrictive piece of CCI among pieces of CCI pertaining to partial contents of which the content is composed.

Accordingly, as the restrictiveness of the CCI increases, i.e. as an increasingly crucial partial content is transmitted, the auxiliary information can be encrypted with a correspondingly stronger encryption method. Malicious copying of crucial contents can thus be more appropriately restricted.

(g) The auxiliary information may include information specifying a position on a playback time axis of the content for each unit of playback of the content.

With this structure, the external device can, without analyzing the received first partial stream, not only play back the content from the top but also resume playback from a predetermined position in the content and fast-forward through the content.

(h) The content may be coded with a predetermined coding method, and the auxiliary information may include information indicating the coding method.

With this structure, the external device can, without analyzing the received first partial stream, decode and play back the coded content.

(i) The generation unit may generate the auxiliary information upon acquisition of the content stream, and the transmission unit may transmit the transmission target stream based on a request from a user.

With this structure, the transmission control device generates the auxiliary information upon receiving the content stream. Therefore, upon a request from the user, the transmission control device can rapidly start to transmit the transmission target stream. In other words, the time from the receipt of a request from the user until the time when the content is recorded on the external device and is ready for playback is shortened.

(j) A reception control device according to an aspect of the present invention is a reception control device in a content storage/playback device that has a function to play back a stored content, the reception control device comprising: a stream storage unit; an auxiliary information storage unit; and a reception unit operable to receive a transmission target stream transmitted by the transmission control device of claim 1, to acquire a content stream and auxiliary information based on a first stream portion and a second stream portion composing the received transmission target stream, and to store the acquired content stream in the stream storage unit and the acquired auxiliary information in the auxiliary information storage unit.

With the above structure, the reception control device according to this aspect of the present invention can acquire the auxiliary information necessary for at least one of recording and playback of the content from the second stream portion in the received transmission target stream. This reduces the processing load as compared to when generating the entire auxiliary information necessary for recording and playback of the content.

Accordingly, a content storage/playback device that includes the reception control device can start to play back the content in the transmission target stream after a shorter time from the start of transmission of the transmission target stream by the transmission control device.

Figure 14B:
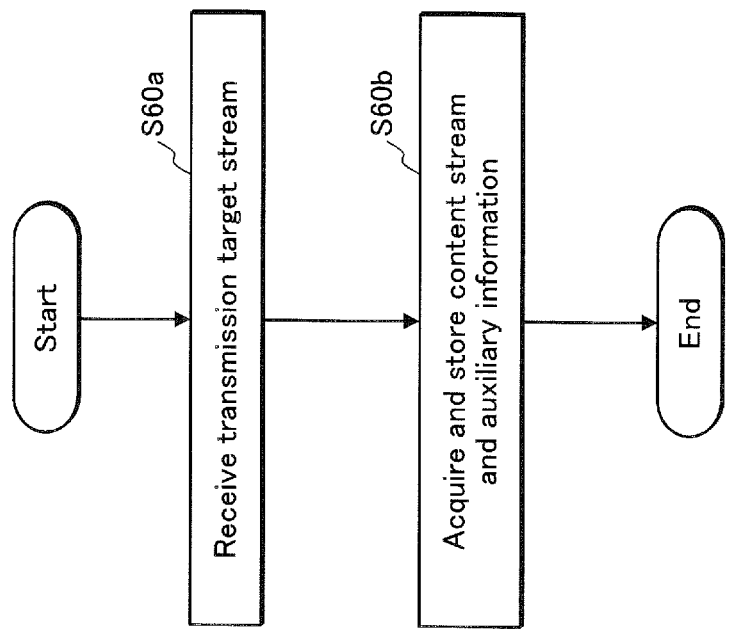
FIG. 14 illustrates a transmission control method and a reception control method according to the present invention.
Figure 14A:
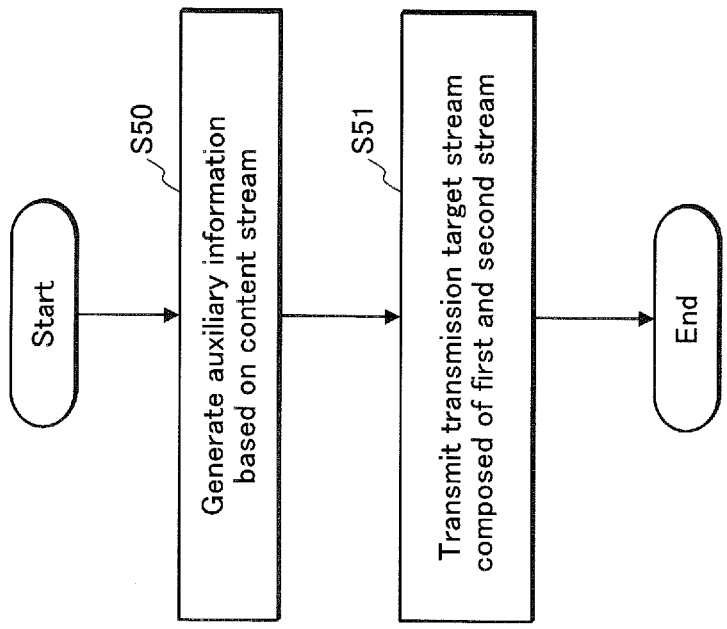

(k) A transmission control method according to an aspect of the present invention is for a transmission control device and includes, as shown for example in FIG. 14A, a generation step S50 to generate, based on a content stream acquired from an external source, auxiliary information necessary for at least one of recording and playback of a content in the content stream and a transmission step S51 to transmit a transmission target stream to an external device, the transmission target stream including a first stream portion based on the content stream and a second stream portion based on the auxiliary information generated during the generation step.

The processing in the generation step S50 for example corresponds to the processing described in the <Data> and <Auxiliary Information> sections of the embodiment whereby the auxiliary information generation unit 116 of the transmission control device 110 generates the auxiliary information 30 based on information transmitted by the video analysis unit 113, the audio analysis unit 114, and the section analysis unit 115.

The processing in the transmission step S51 for example corresponds to the processing described in steps S20-S30 of FIG. 12, whereby a transmission target stream is transmitted to the content storage/playback device 200, the transmission target stream being composed of (i) a stream constituted by TTS packets storing the auxiliary information 39 generated based on the auxiliary information 30 read from the auxiliary information storage unit 103 of the content recording device 100 and (ii) a changed partial stream generated based on the partial stream 20 read from the stream storage unit 102.

(l) A reception control method according to an aspect of the present invention is for a reception control device in a content storage/playback device that has a function to play back a stored content, the reception control device comprising a stream storage unit and an auxiliary information storage unit. The reception control method includes, as shown for example in FIG. 14B, reception steps S60a-S60b to receive a transmission target stream transmitted by the transmission control device according to an aspect of the present invention, to acquire a content stream and auxiliary information based on a first stream portion and a second stream portion composing the received transmission target stream, and to store the acquired content stream in the stream storage unit and the acquired auxiliary information in the auxiliary information storage unit.

The processing in the reception steps S60a-S60b for example corresponds to the following processing, described in steps S31-S40 of FIG. 13. The content storage/playback device 200 repeatedly receives encrypted packets constituting the transmission target stream 60 and, when a TTS packet obtained by decrypting a received encrypted packet is a NULL packet, acquires the data from the NULL packet and stores the data in the auxiliary information storage unit 203. Once the entire auxiliary information 39 has been received, TTS packets obtained by decrypting subsequently received encrypted packets are stored in the stream storage unit 202.

INDUSTRIAL APPLICABILITY

The present invention can be used for transmission control of recorded contents.

REFERENCE SIGNS LIST 1 local network
2 television antenna
3 display device
100 content recording device
101 selection unit
102, 202 stream storage unit
103, 203 auxiliary information storage unit
104, 211 user I/F
105 recording control unit
106 stream recording control unit
110 transmission control device
111 generation unit
112 demultiplexer
113 video analysis unit
114 audio analysis unit
115 section analysis unit
116 auxiliary information generation unit
117 transmission unit
118 stream generation/encryption unit
119, 205 transmission I/F
120 content transmission control unit
200 content storage/playback device
201 reception control device
204 reception unit
206 stream decryption/analysis unit
212 auxiliary information management unit
213 stream decoder 214 AV output unit
215 playback control unit

The invention claimed is:

1. A transmission control device comprising:
a recording unit operable to, upon receiving input of a content composed of a plurality of TS packets, (i) attach an extension header including an arrival time stamp to each of the TS packets, and (ii) record the content on a recording medium;
a generation unit operable to (i) acquire time map information and segment management information by analyzing video or audio composed of TS packets, and (ii) generate first auxiliary information including the time map information, the segment management information, and copy control information (CCI); and
a transmission unit operable to (i) generate a partial stream composed of some or all of the TS packets based on the content and the first auxiliary information, (ii) generate second auxiliary information including the time map information, the segment information, and the CCI based on the first auxiliary information pertaining to the partial stream, (iii) store the second auxiliary information in one or more packets not included in the partial stream, (iv) generate a transmission target stream composed of the partial stream and the one or more packets storing therein the second auxiliary information, and (v) transmit the transmission target stream to an external device, wherein
the time map information included in the first auxiliary information and the second auxiliary information indicates a packet number of an access unit of a video stream or an audio stream composed of TS packets in association with a time stamp of the access unit, and
the segment management information included in the first auxiliary information and the second auxiliary information includes a start presentation time stamp, an end presentation time stamp, a packet identifier, video coding information, audio coding information, a start packet number, and an end packet number.

2. The transmission control device of claim 1, wherein the transmission unit transmits the transmission target stream after attaching an identifier to each of the one or more packets storing therein the second auxiliary information, the identifier indicating that the one or more packets store therein the second auxiliary information.

3. The transmission control device of claim 2, wherein as the identifier, the transmission unit attaches a packet identifier (PID) to each of the one or more packets storing therein the second auxiliary information, the PID differing from a PID of each TS packet constituting the partial stream.

4. The transmission control device of claim 3, wherein the PID attached by the transmission unit to each of the one or more packets storing therein the second auxiliary information indicates that each of the one or more packets is a NULL packet.

5. The transmission control device of claim 2, wherein the one or more packets storing therein the second auxiliary information are encrypted based on the CCI included in the second auxiliary information.

6. The transmission control device of claim 5, wherein the transmission unit performs the encryption using an encryption method corresponding to a CCI among one or more CCIs corresponding to the TS packets included in the partial stream that is most restrictive.

7. The transmission control device of claim 1, wherein the generation unit generates the first auxiliary information upon acquisition of the content, and
the transmission unit transmits the transmission target stream based on a request from a user.

8. A reception control device for receiving a transmission target stream transmitted by a transmission control device, the reception control device comprising:
an acquisition unit operable to acquire (i) a partial stream extracted from a body stream and (ii) second auxiliary information corresponding to the partial stream, the partial stream and the second auxiliary information being acquired from a transmission target stream including the body stream, first auxiliary information corresponding to the body stream, the partial stream, and the second auxiliary information; and
a storage unit operable to store the partial stream and the second auxiliary information acquired by the acquisition unit, wherein
the partial stream is composed of a plurality of TS packets, an extension header including an arrival time stamp being attached to each of the TS packets,
the second auxiliary information includes time map information, segment management information, and copy control information (CCI),
the time map information included in the second auxiliary information indicates a packet number of an access unit of a video stream or an audio stream composed of TS packets in association with a time stamp of the access unit, and
the segment management information included in the second auxiliary information includes a start presentation time stamp, an end presentation time stamp, a packet identifier, video coding information, audio coding information, a start packet number, and an end packet number.

9. A transmission control method for a transmission control device, comprising the steps of:
upon receiving input of a content composed of a plurality of TS packets, (i) attaching an extension header including an arrival time stamp to each of the TS packets, and (ii) recording the content on a recording medium;
(i) acquiring time map information and segment management information by analyzing video or audio composed of TS packets, and (ii) generating first auxiliary information including the time map information, the segment management information, and copy control information (CCI); and
(i) generating a partial stream composed of some or all of the TS packets based on the content and the first auxiliary information, (ii) generating second auxiliary information including the time map information, the segment management information, and the CCI based on the first auxiliary information pertaining to the partial stream, (iii) generating a transmission target stream composed of the partial stream and the one or more packets storing therein the second auxiliary information, and (iv) transmitting the transmission target stream to an external device, wherein
the time map information included in the first auxiliary information and the second auxiliary information indicates a packet number of an access unit of a video stream or an audio stream composed of TS packets in association with a time stamp of the access unit, and
the segment management information included in the first auxiliary information and the second auxiliary information includes a start presentation time stamp, an end presentation time stamp, a packet identifier, video coding information, audio coding information, a start packet number, and an end packet number.

10. A reception control method for a reception control device that receives a transmission target stream transmitted by a transmission control device,
the reception control device comprising a storage unit, and the reception control method comprising the steps of:
acquiring (i) a partial stream extracted from a body stream and (ii) second auxiliary information corresponding to the partial stream, the partial stream and the second auxiliary information being acquired from a transmission target stream including the body stream, first auxiliary information corresponding to the body stream, the partial stream, and the second auxiliary information; and
storing, in the storage unit, the partial stream and the second auxiliary information acquired in the acquisition step, wherein
the partial stream is composed of a plurality of TS packets, an extension header including an arrival time stamp being attached to each of the TS packets,
the second auxiliary information includes time map information, segment management information, and copy control information (CCI),
the time map information included in the second auxiliary information indicates a packet number of an access unit of a video stream or an audio stream composed of TS packets in association with a time stamp of the access unit, and
the segment management information included in the second auxiliary information includes a start presentation time stamp, an end presentation time stamp, a packet identifier, video coding information, audio coding information, a start packet number, and an end packet number.

11. A non-transitory computer readable recording medium having stored thereon a transmission control program for causing a processor in a transmission control device to perform a transmission control method comprising the steps of:
upon receiving input of a content composed of a plurality of TS packets, (i) attaching an extension header including an arrival time stamp to each of the TS packets, and (ii) recording the content on a recording medium;
(i) acquiring time map information and segment management information by analyzing video or audio composed of TS packets, and (ii) generating first auxiliary information including the time map information, the segment management information, and copy control information (CCI); and
(i) generating a partial stream composed of some or all of the TS packets based on the content and the first auxiliary information, generating second auxiliary information including the time map information, the segment management information, and the CCI based on the first auxiliary information pertaining to the partial stream, (ii) generating a transmission target stream composed of the partial stream and the one or more packets storing therein the second auxiliary information, and (iii) transmitting the transmission target stream to an external device, wherein
the time map information included in the first auxiliary information and the second auxiliary information indicates a packet number of an access unit of a video stream or an audio stream composed of TS packets in association with a time stamp of the access unit, and
the segment management information included in the first auxiliary information and the second auxiliary information includes a start presentation time stamp, an end presentation time stamp, a packet identifier, video coding information, audio coding information, a start packet number, and an end packet number.

12. An integrated circuit for transmission control used in a transmission control device, comprising:
a recording unit operable to, upon receiving input of a content composed of a plurality of TS packets, (i) attach an extension header including an arrival time stamp to each of the TS packets, and (ii) record the content on a recording medium;
a generation unit operable to (i) acquire time map information and segment management information by analyzing video or audio composed of TS packets, and (ii) generate first auxiliary information including the time map information, the segment management information, and copy control information (CCI); and
a transmission unit operable to (i) generate a partial stream composed of some or all of the TS packets based on the content and the first auxiliary information, (ii) generate second auxiliary information including the time map information, the segment management information, and the CCI based on the first auxiliary information pertaining to the partial stream, (iii) store the second auxiliary information in one or more packets not included in the partial stream, (iv) generate a transmission target stream composed of the partial stream and the one or more packets storing therein the second auxiliary information, and (v) transmit the transmission target stream to an external device, wherein
the time map information included in the first auxiliary information and the second auxiliary information indicates a packet number of an access unit of a video stream or an audio stream composed of TS packets in association with a time stamp of the access unit, and
the segment management information included in the first auxiliary information and the second auxiliary information includes a start presentation time stamp, an end presentation time stamp, a packet identifier, video coding information, audio coding information, a start packet number, and an end packet number.

13. An integrated circuit for reception control in a reception control device for receiving a transmission target stream transmitted by a transmission control device, the integrated circuit comprising:
an acquisition unit operable to acquire (i) a partial stream extracted from a body stream and (ii) second auxiliary information corresponding to the partial stream, the partial stream and the second auxiliary information being acquired from a transmission target stream including the body stream, first auxiliary information corresponding to the body stream, the partial stream, and the second auxiliary information; and
a storage unit operable to store the partial stream and the second auxiliary information acquired by the acquisition unit, wherein
the partial stream is composed of a plurality of TS packets, an extension header including an arrival time stamp being attached to each of the TS packets,
the second auxiliary information includes time map information, segment management information, and copy control information (CCI),
the time map information included in the second auxiliary information indicates a packet number of an access unit of a video stream or an audio stream composed of TS packets in association with a time stamp of the access unit, and the segment management information included in the second auxiliary information includes a start presentation time stamp, an end presentation time stamp, a packet identifier, video coding information, audio coding information, a start packet number, and an end packet number.

\* \* \* \* \*